(12) United States Patent
Mookiah et al.

(10) Patent No.: US 9,560,073 B2
(45) Date of Patent: Jan. 31, 2017

(54) RECONFIGURABLE ANTENNA BASED SOLUTIONS FOR DEVICE AUTHENTICATION AND INTRUSION DETECTION IN WIRELESS NETWORKS

(75) Inventors: Prathaban Mookiah, San Diego, CA (US); Kapil R. Dandekar, Philadelphia, PA (US); John MacLaren Walsh, Philadelphia, PA (US); Rachel Greenstadt, Philadelphia, PA (US)

(73) Assignee: Drexel University, Philadelphia, PA (US)

( * ) Notice: Subject to any disclaimer, the term of this patent is extended or adjusted under 35 U.S.C. 154(b) by 196 days.

(21) Appl. No.: 14/343,244

(22) PCT Filed: Sep. 7, 2012

(86) PCT No.: PCT/US2012/054205
§ 371 (c)(1),
(2), (4) Date: Jul. 24, 2014

(87) PCT Pub. No.: WO2013/036794
PCT Pub. Date: Mar. 14, 2013

(65) Prior Publication Data
US 2015/0135293 A1    May 14, 2015

Related U.S. Application Data

(60) Provisional application No. 61/532,353, filed on Sep. 8, 2011, provisional application No. 61/532,136, filed on Sep. 8, 2011.

(51) Int. Cl.
G06F 7/04      (2006.01)
H04L 29/06    (2006.01)
(Continued)

(52) U.S. Cl.
CPC .......... *H04L 63/1483* (2013.01); *H04L 63/08* (2013.01); *H04W 12/06* (2013.01); *H04W 12/12* (2013.01); *H04L 63/1416* (2013.01)

(58) Field of Classification Search
CPC ...... H04L 63/08; H04L 63/0876; H04L 63/18; G06F 21/30
(Continued)

(56) References Cited

U.S. PATENT DOCUMENTS 6,636,721 B2 *  10/2003  Threadgill ......... H04B 7/18506
                                                     455/12.1
6,675,095 B1 *   1/2004  Bird ...................... G05D 1/0061
                                                     340/436
(Continued)

FOREIGN PATENT DOCUMENTS

WO    WO 2013/036794    3/2013

OTHER PUBLICATIONS

Arbaugh et al, "Your 802.11 Wireless Network Has No Clothes", IEEE Wireless Communications, Dec. 2002, 9(6), 44-51.
(Continued)

*Primary Examiner* — Dede Zecher
*Assistant Examiner* — Viral Lakhia
(74) *Attorney, Agent, or Firm* — Baker & Hostetler LLP

(57) ABSTRACT

Channel based authentication schemes for intrusion detection that operates at the physical layer are described that apply the capabilities of a pattern re-configurable antenna for improved performance. Performance gains are achieved by the schemes as a function of the number of antenna modes. The first scheme relies on a channel based fingerprint for differentiating between transmitters whereas another scheme poses the intruder detection problem as a generalized likelihood ratio (GLR) test problem that operates on the channel realizations corresponding to different modes present in a reconfigurable antenna. The benefits of these two schemes over single element antennas are demonstrated.

(Continued)

General guidelines are provided on how to choose the different elements of the decision metric in order to realize better performance for physical layer based authentication schemes based on any diversity scheme.

23 Claims, 22 Drawing Sheets

(51) Int. Cl.
 *H04W 12/12* (2009.01)
 *H04W 12/06* (2009.01)
(58) Field of Classification Search
 USPC ...... 713/168; 370/252, 335; 455/456.1, 63.4
 See application file for complete search history.

(56) References Cited

U.S. PATENT DOCUMENTS

| | | | |
|---|---|---|---|
| 6,850,497 B1* | 2/2005 | Sigler | H04B 7/1853 370/310 |
| 7,103,460 B1* | 9/2006 | Breed | B60C 23/0408 701/29.1 |
| 7,404,074 B2* | 7/2008 | Murotake | G06F 9/4401 713/1 |
| 8,135,953 B2* | 3/2012 | Kumoluyi | H04L 63/105 713/168 |
| 8,249,028 B2* | 8/2012 | Porras | H04W 99/00 370/328 |
| 8,483,704 B2* | 7/2013 | Nanda | H04W 48/16 455/456.1 |
| 8,789,191 B2* | 7/2014 | Bhagwat | H04L 12/2602 726/25 |
| 2004/0127247 A1 | 7/2004 | Reece et al. | |
| 2005/0180315 A1 | 8/2005 | Chitrapu et al. | |
| 2007/0025245 A1 | 2/2007 | Porras et al. | |
| 2007/0025265 A1* | 2/2007 | Porras | G06K 7/0008 370/252 |
| 2007/0083246 A1* | 4/2007 | Mazar | A61N 1/37235 607/60 |
| 2007/0128899 A1* | 6/2007 | Mayer | G06F 9/4406 439/152 |
| 2008/0148059 A1* | 6/2008 | Shapiro | G06F 21/32 713/186 |
| 2010/0033386 A1 | 2/2010 | Lewis et al. | |
| 2010/0317374 A1* | 12/2010 | Alpert | H04W 68/02 455/458 |
| 2012/0083217 A1* | 4/2012 | Jin | H04B 7/0617 455/63.4 |
| 2013/0109405 A1* | 5/2013 | Siomina | H04W 64/00 455/456.1 |
| 2014/0173682 A1* | 6/2014 | Xiao | H04L 9/3236 726/1 |

OTHER PUBLICATIONS

Azimi-Sadjadi et al, "Robust Key Generation from Signal Envelopes in Wireless Networks", Proceedings of the 14th ACM Conference on Computer and Communications Security, Oct. 29-Nov. 2, 2007, 401-410.

Borisov et al, "Intercepting Mobile Communications: The Insecurity of 802.11", Proceedings of the 7th Annual International Conference on Mobile Computing and Networking, Jul. 2001, 180-189, New York, NY.

Demirbas, M. and Song, Y., "An RSSI-based Scheme for Sybil Attack Detection in Wireless Sensor Networks", Proceedings of the 2006 International Symposium on on World of Wireless, Mobile and Multimedia Networks. IEEE Computer Society, 2006, 564-570.

Faria, D. and Cheriton, D. "Detecting Identity-Based Attacks in Wireless Networks Using Signalprints", Proceedings of the 5th ACM workshop on Wireless security, Sep. 2006, 43-52. ACM.

Forenza A., and Heath, R. W., Benefit of pattern diversity via two-element array of circular patch antennas in indoor clustered MIMO channels. Communications, IEEE Transactions on, 2006, 54(5), 943-954.

Hershey et al, "Unconventional Cryptographic Keying Variable Management", Communications, IEEE Transactions on, Jan. 1995, 43(1), 3-6.

International Patent Application No. PCT/US2012/054205: International Search Report and Written Opinion dated Nov. 19, 2012, 7 pages.

Jana et al, "On the Effectiveness of Secret Key Extraction from Wireless Signal Strength in Real Environments", Proceedings of the 15th annual international conference on Mobile computing and networking, NY, New York, ACM, Sep. 20-25, 2009, 321-332.

Kitaura et al, "A scheme of private key agreement based on the channel characteristics in OFDM land mobile radio". Electronics and Communications in Japan (Part III: Fundamental Electronic Science), Sep. 2005, 88(9), 1-10.

Kountouriotis et al, "Performance analysis of a reconfigurable antenna system for MIMO communications", In Antennas and Propagation (EUCAP), Proceedings of the 5th European Conference on IEEE, Apr. 2011, 543-547.

Medbo et al, "Temporal Radio Channel Variations With Stationary Terminal." In Vehicular Technology Conference, 2004. VTC2004—Fall. 2004 IEEE 60th, 1, 91-95. IEEE, 2004.

Oestges et al, "Channel Characterization of Indoor Wireless Personal Area Networks", Antennas and Propagation, IEEE Transactions on, Nov. 2006, 54(11), 3143-3150.

Pagani, P and Pajuisco, P., "Characterization and Modeling of Temporal Variations on an Ultrawideband Radio Link", Antennas and Propagation, IEEE Transactions on, Nov. 2006, 54(11), 3198-3206.

Patwari et al, "High-Rate Uncorrelated Bit Extraction for Shared Secret Key Generation from Channel Measurements", IEEE Transactions on Mobile Computing, Jan. 2010, 9(1), 17-30.

Patwari et al, "Robust Location Distinction Using Temporal Link Signatures." Proceedings of the 13th annual ACM international conference on Mobile computing and networking. ACM, Sep. 2007, 111-122.

Piazza et al, "Experimental Analysis of Pattern and Polarization Reconfigurable Circular Patch Antennas for MIMO Systems", Vehicular Technology, IEEE Transactions on, Jun. 2010, 59(5), 2352-2362.

Piazza et al, "Performance Improvement of a Wideband MIMO System by Using Two-Port RLWA." Antennas and Wireless Propagation Letters, IEEE, 2009, 8, 830-834.

Sijbers et al, "Maximum-Likelihood Estimation of Rician Distribution Parameters", IEEE Trans. Med. Imaging, Jun. 1998, 17(3), 357-361.

Xiao et al, "Channel-Based Spoofing Detection in Frequency-Selective Rayleigh Channels". Wireless Communications, IEEE Transactions on, Dec. 2009, 8(12), 5948-5956.

Xiao et al, "Fingerprints in the ether: Using the Physical Layer for Wireless Authentication." Communications, 2007. ICC'07. IEEE International Conference on. IEEE, Jun. 2007, 4646-4651.

Xiao et al, "MIMO-Assisted Channel-Based Authentication in Wireless Networks." In Information Sciences and Systems, 2008. CISS 2008. 42nd Annual Conference on IEEE, Jul. 2008, 642-646.

Xiao et al, "Using the Physical Layer for Wireless Authentication in Time-Variant Channels". Wireless Communications, IEEE Transactions on, Jul. 2008, 7(7), 2571-2579.

Yasukawa et al, "Adaptive key generation in secret key agreement scheme based on the channel characteristics in OFDM", Information Theory and Its Applications, 2008. ISITA 2008. International Symposium on. IEEE, Dec. 2008, 1-6.

Zhang, Y., and Lee, W., "Intrusion Detection in Wireless Ad-Hoc Networks." In Proceedings of the 6th annual international conference on Mobile computing and networking, 2000, 275-283. ACM.

* cited by examiner

RECONFIGURABLE ANTENNA BASED SOLUTIONS FOR DEVICE AUTHENTICATION AND INTRUSION DETECTION IN WIRELESS NETWORKS

CROSS-REFERENCE TO RELATED APPLICATIONS

This application is the National Stage of International Application No. PCT/US2012/054205, filed Sep. 7, 2012, which claims the benefit of U.S. Provisional Application No. 61/532,353, filed Sep. 8, 2011 and U.S. Provisional Application No. 61/532,136, filed Sep. 8, 2011, the disclosures of which are incorporated herein by reference in their entireties.

STATEMENT OF FEDERALLY SPONSORED RESEARCH

This invention was made with government support under Grant Nos. 0916480 and 1028608 awarded by the National Science Foundation. The government has certain rights in the invention.

TECHNICAL FIELD

The present invention relates generally to the field of multi-element antenna systems. Specifically, the present invention relates to methods for device authentication and intrusion detection in MIMO systems using multi-element reconfigurable antennas.

BACKGROUND

Large scale proliferation of wireless technology coupled with the increasingly hostile information security landscape is of serious concern. The fundamental broadcast nature of wireless data transmission aggravates the situation since unlike wired networks it introduces multiple avenues for attack and penetration into a network. Attacks on wireless networks have become increasingly sophisticated with the increasing pervasiveness of these networks. It is challenging to detect and counteract intrusions in wireless networks due to the inherent broadcast nature of the medium. Currently known security risks include denial of service attacks, man-in-the-middle attacks, MAC address spoofing attacks, client-to-client attacks, network injection and brute force attacks against access point passwords. Man-in-the-middle attacks and spoofing attacks pose a particularly significant intrusion threat to wireless networks since such attacks allow intruders to hijack a connection already established by a legitimate user. These risks will continue to increase in number and sophistication as wireless networks start to carry increasingly more sensitive information.

Though advanced wireless intrusion protection and detection systems have been developed and deployed to mitigate such threats, it has been repeatedly demonstrated that each method has its point of failure and no single method guarantees protection against all attacks. See, e.g., W. A. Arbaugh, N. R. Shankar and Y. C. Justin Wan, "Your 802.11 Wireless Network has No Clothes," IEEE Wireless Communications, pages 44-51, 2001; N. Borisov, I. Goldberg, and D. Wagner, "Intercepting mobile communications: the insecurity of 802.11," MobiCom '01: Proceedings of the 7th annual international conference on Mobile computing and networking, pages 180-189, New York, N.Y., USA, 2001: ACM. Also, while several established protection mechanisms such as cryptography based techniques and wireless intrusion prevention systems exist, each method has its own weaknesses and is susceptible to failure under different circumstances. The resulting uncertainties have led to a significant paradigm shift in the design and implementation of wireless security in recent times, where an increasingly cross-layer approach is being pursued to protect wireless networks. One such avenue for security has been to use the physical layer information to protect against intruders and attackers. Especially channel information available at the physical layer is being increasingly used to provide an additional degree of protection against intruders. The idea of using physical layer information to enhance security has been approached under two broad categories. The first category of work focuses on cryptography based techniques that utilize physical layer information to generate and share keys. See, e.g., B. Azimi-Sadjadi, A. Kiayias, A. Mercado, and B. Yener, "Robust key generation from signal envelopes in wireless networks," in CCS '07: *Proceedings of the 14th ACM conference on Computer and communications security*. New York, N.Y., USA: ACM, 2007, pp. 401-410; J. E. Hershey, A. A. Hassan, and R. Yarlagadda, "Unconventional cryptographic keying variable management," *Communications, IEEE Transactions on*, 43(1):3-6, 1995; S. Jana, S. N. Premnath, M. Clark, S. K. Kasera, N. Patwari, and S. V. Krishnamurthy, "On the effectiveness of secret key extraction from wireless signal strength in real environments," in *Proceedings of the 15th annual international conference on Mobile computing and networking*. New York, N.Y., USA: ACM, 2009, pp. 321-332; and H. Kitaura, A. Sasaoka, "A scheme of private key agreement based on the channel characteristics in OFDM land mobile radio," *Electronics and Communications in Japan Part 3: Fundamental Electronic Science*, vol. 88, no. 9, pp. 1-10, 2005; N. Patwari, J. Croft, S. Jana, and S. K. Kasera, "High-Rate Uncorrelated Bit Extraction for Shared Secret Key Generation from Channel Measurements. *IEEE Transactions on Mobile Computing*, 9:17-30, 2009; and S. Yasukawa, H. Iwai, and H. Sasaoka, "Adaptive key generation in secret key agreement scheme based on the channel characteristics in OFDM," *Information Theory and Its Applications*, 2008, ISITA 2008, International Symposium on, pages 1-6, 2008. In the second approach, some form of the physical layer information associated with a device, such as channel frequency response or RSSI, is used as an identifier to differentiate between different devices and thus provide a mechanism for authentication. See e.g., M. Demirbas and Y. Song, "An RSSI-based Scheme for Sybil Attack Detection in Wireless Sensor Networks," WOWMOM '06: *Proceedings of the 2006 International Symposium on World of Wireless, Mobile and Multimedia Networks*, pages 564-570, Washington, D.C., USA, 2006, IEEE Computer Society; D. B. Faria and D. R. Cheriton, "Detecting identity-based attacks in wireless networks using signal prints," in WiSe '06: *Proceedings of the 5th ACM workshop on Wireless security*. New York, N.Y., USA: ACM, 2006, pp. 43-52; N. Patwari and S. K. Kasera, "Robust location distinction using temporal link signatures," in MobiCom '07: *Proceedings of the 13th annual ACM international conference on Mobile computing and networking*. New York, N.Y., USA: ACM, 2007, pp. 111-122; L. Xiao, L. Greenstein, N. Mandayam, and W. Trappe, "Fingerprints in the ether: Using the physical layer for wireless authentication," in *Communications*, 2007. ICC '07. *IEEE International Conference on*, June 2007, pp. 4646-4651; L. Xiao, L. Greenstein, N. Mandayam, and W. Trappe, "Using the physical layer for wireless authentication in time-variant channels," *Wireless Communications, IEEE*

Transactions on, 7(7):2571-2579, 2008; and "Channel-based spoofing detection in frequency-selective Rayleigh channels," *Wireless Communications, IEEE Transactions on*, vol. 8, no. 12, pp. 5948-5956, 2009.

Intrusion detection has traditionally been categorized into misuse detection or anomaly detection techniques. While the former uses patterns characteristic of known attacks to detect known intrusions, the latter relies on detecting deviations from the established behavior patterns in the system. Y. Zhang and W. Lee, "Intrusion detection in wireless ad-hoc networks," *Proceedings of the 6th annual international conference on Mobile computing and networking in Mobi-Com '00*, pages 275-283, New York, N.Y., USA, 2000, ACM. In many usage scenarios, where the physical link remains unchanged over a session, the wireless channel response corresponding to the link can be considered to represent the established behavior pattern for that link. Any changes that violate this pattern abruptly beyond a certain limit can be then checked for adversarial behavior.

In parallel to these developments, significant progress has been made in the design of reconfigurable antennas resulting in numerous designs that are reconfigurable in frequency, pattern, polarization or a combination of these parameters. For many new and emerging high data rate applications, pattern reconfigurable antennas are of special interest due to their ability to generate highly uncorrelated radiation patterns that can produce uncorrelated channel realizations in a multi-path rich wireless medium for a given frequency. See, e.g., A. Forenza and J. Heath, R. W., "Benefit of pattern diversity via two-element array of circular patch antennas in indoor clustered MIMO channels," *Communications, IEEE Transactions on*, vol. 54, no. 5, pp. 943-954, May 2006. The ability of pattern reconfigurable antennas to enhance system throughput has been well demonstrated by D. Piazza, P. Mookiah, M. D'Amico, and K. R. Dandekar, "Experimental Analysis of Pattern and Polarization Reconfigurable Circular Patch Antennas for MIMO Systems, Vehicular Technology, IEEE Transactions on, 59(5):2352-2362, 2010. Such antennas have gained widespread attention due to their ability to improve throughput and are gradually finding their way into commercial wireless systems. The uncorrelated nature of the channel realizations due to such an antenna are believed by the inventors to hold great potential to enhance physical layer based security schemes.

Previous works that explored the idea of physical layer information based authentication are based on the use of conventional antennas. It is desired to demonstrate how the capabilities of reconfigurable antennas to generate decorrelated channels can be used to enhance physical layer information based device authentication schemes for wireless systems. However, it should be noted that the security scheme described herein is not meant to be a replacement for existing higher layer security algorithms. Instead, it is desired to leverage the capabilities of reconfigurable antennas to provide an additional layer of security for wireless systems. Moreover, it is also desired to develop a general guideline on how to choose the different elements of the decision metric in order to realize better performance for physical layer based authentication schemes based on any diversity scheme.

The problem that is addressed by the invention is one of establishing the identity of a transmitting device in a wireless network. Spoofing attacks in network security encompasses a wide range of attacks that are based on one entity deceiving another to accept the attacking entity's identity to be something else. Many variants of this attack rely on the attacker monitoring the packet flow between the victims to obtain some sensitive information that identifies one or both of the victims. Information obtained thus serves as the launching pad for more sophisticated attacks. Due to the unbounded nature of the medium employed, such information can be obtained easily in a wireless network making them especially vulnerable to such attacks. Hence, an additional mechanism for protection at the physical layer that can detect intrusion and thwart such attacks can significantly enhance the security of a wireless network. The present invention addresses these needs in the art.

SUMMARY

The invention addresses the above problems by providing a device authentication scheme that utilizes the capabilities of reconfigurable antennas to provide a robust additional layer of security against attacks that are based on spoofing transmitter identities as well as man-in-the-middle attacks. Wireless channel information is available to the transmitter at the physical layer for channel equalization. Channel information corresponding to different modes in the reconfigurable antenna is combined to form a fingerprint for a legitimate transmitter during the outset of the connection. Channel information corresponding to later transmissions from the transmitter is compared with this fingerprint based on a test metric such as the angle between the fingerprint corresponding to the incoming transmission and fingerprint value stored in memory. The acceptable angle range between the two fingerprints is determined based on the acceptable false alarm rate.

The probability distribution function required to determine an adaptive threshold for a given false alarm rate is computed during the connection initialization phase. Multiple training packets are transmitted from the legitimate transmitter to the receiver and the test metric is computed between fingerprints corresponding to all the training packets. The computed metrics are gathered to form the distribution function on the metric to determine the threshold for a given false alarm rate.

The method is most efficient when the different modes of the multi-element reconfigurable antenna are substantially decorrelated. Channel estimates for all the different modes may be obtained without degrading throughput and power consumption by cycling respective antennas in the communication system through the modes during the transmission of a data packet including training symbols, a payload, and a pad between the payload and training symbols. Preferably, the pad has a duration long enough to permit the respective antennas to switch modes while a channel estimation is being performed for the respective modes.

The methods described herein show marked improvement in intruder detection rates. Increasing the number of antenna modes used in the fingerprint improves detection rates linearly at low false alarm rates. Moreover, the method provides a precise guideline on how to choose a reconfigurable antenna and the number of modes in order to achieve the required level performance in a given environment. Enforcing security at the lower layer provides a robust extra level of security and helps the upper level layers to better handle spoofing and man-in-the-middle attacks.

The invention further addresses the above problems by providing intrusion detection by monitoring the channel for any abrupt changes in its statistics through repeated applications of the generalized likelihood ratio (GLR) test. The scheme is based on the idea that the statistics of the link corresponding to an intruder who is physically located at a different location will be different from that of the legitimate user and when the intruder tries to inject packets over the same connection, it will trigger an abrupt change in the GLR value. Additionally, the invention utilizes a pattern reconfigurable antenna to improve the performance of the intrusion detection scheme. By picking antenna modes that are decorrelated in their radiation patterns, decorrelated channel realizations can be obtained to enhance system performance. Hence, channels corresponding to different modes of the antenna can be expected to have different statistics, a property which is exploited to the benefit of the proposed detection scheme.

However, the use of reconfigurable antennas (pattern diversity) should be differentiated from schemes that use multiple antennas (spatial diversity) with perfect decorrelation between the elements. See, e.g., L. Xiao, L. Greenstein, N. Mandayam, and W. Trappe, "MIMO-assisted channel-based authentication in wireless networks," Information Sciences and Systems, 2008. CISS 2008. 42nd Annual Conference on, pages 642-646, 2008; L. Xiao, L. Greenstein, N. Mandayam, and W. Trappe, "Using the physical layer for wireless authentication in time-variant channels," Wireless Communications, IEEE Transactions on, 7(7): 2571-2579, 2008; L. Xiao, L. Greenstein, and N. B. Mandayam, and W. Trappe, "Channel-based spoofing detection in frequency-selective Rayleigh channels" Wireless Communications, IEEE Transactions on, 8(12):5948 -5956, 2009. Thus, the invention provides channel correlation between the different diversity branches and specifically quantifies the effect of correlation on detection performance. A reconfigurable antenna provides a more practically viable solution to generate multiple channel realizations than spatially separated multiple antenna elements due to cost and space constraints.

In many public open networks (e.g. coffee shops), higher level authentication solutions are usually not implemented. Freely available software tools such as Firesheep can be used to simply execute session hijacking attacks when users visit insecure websites in such networks. A wireless access point equipped with reconfigurable antennas that can implement the proposed method can be used to provide a layer of security that can significantly alleviate such security threats in these networks. In networks with higher level security mechanisms for encryption, authentication and integrity, the proposed scheme can complement those mechanisms while they continue to play their part in securing the wireless link.

Accordingly, the invention further provides an intrusion detection scheme that operates based on channel information available through a reconfigurable antenna to protect a wireless link against various attacks that are based on spoofing transmitter identities as well as man-in-the-middle attacks. Wireless channel information for the different antenna modes will be available to the transmitter at the physical layer for channel equalization purposes. In accordance with the invention, the statistics of this channel information will show abrupt changes when intrusion occurs. The inventors have devised a generalized likelihood ratio test to repeatedly monitor the statistics of the channel and raise an alarm when an abrupt change is detected. The cumulative change observed in the cumulative statistics of the channels corresponding to the multiple modes of a reconfigurable antenna significantly strengthens the efficacy of the invention compared to a test that relies on the change of statistics corresponding to a fixed mode antenna.

The methods disclosed herein show marked improvement in intruder detection rates. Increasing the number of antenna modes used in the GLR test improves detection rates at low false alarm rates. Moreover, the method provides precise guidelines on how to choose a reconfigurable antenna and the number of modes in order to achieve the required level performance in a given environment. The method of the invention provides a high rate of detection at low false alarm rates. It has been shown that the performance can be increased significantly with the addition of extra antenna modes. Enforcing security at the lower layer provides a robust extra level of security and helps the upper level layers to better handle spoofing and man-in-the-middle attacks.

Reconfigurable antennas are mainly incorporated in wireless devices for their ability to increase spectral efficiency. The techniques described herein add significant additional value to the reconfigurable antenna in the system since it is being employed for an additional purpose as well.

DETAILED DESCRIPTION OF ILLUSTRATIVE EMBODIMENTS

Figure 1:
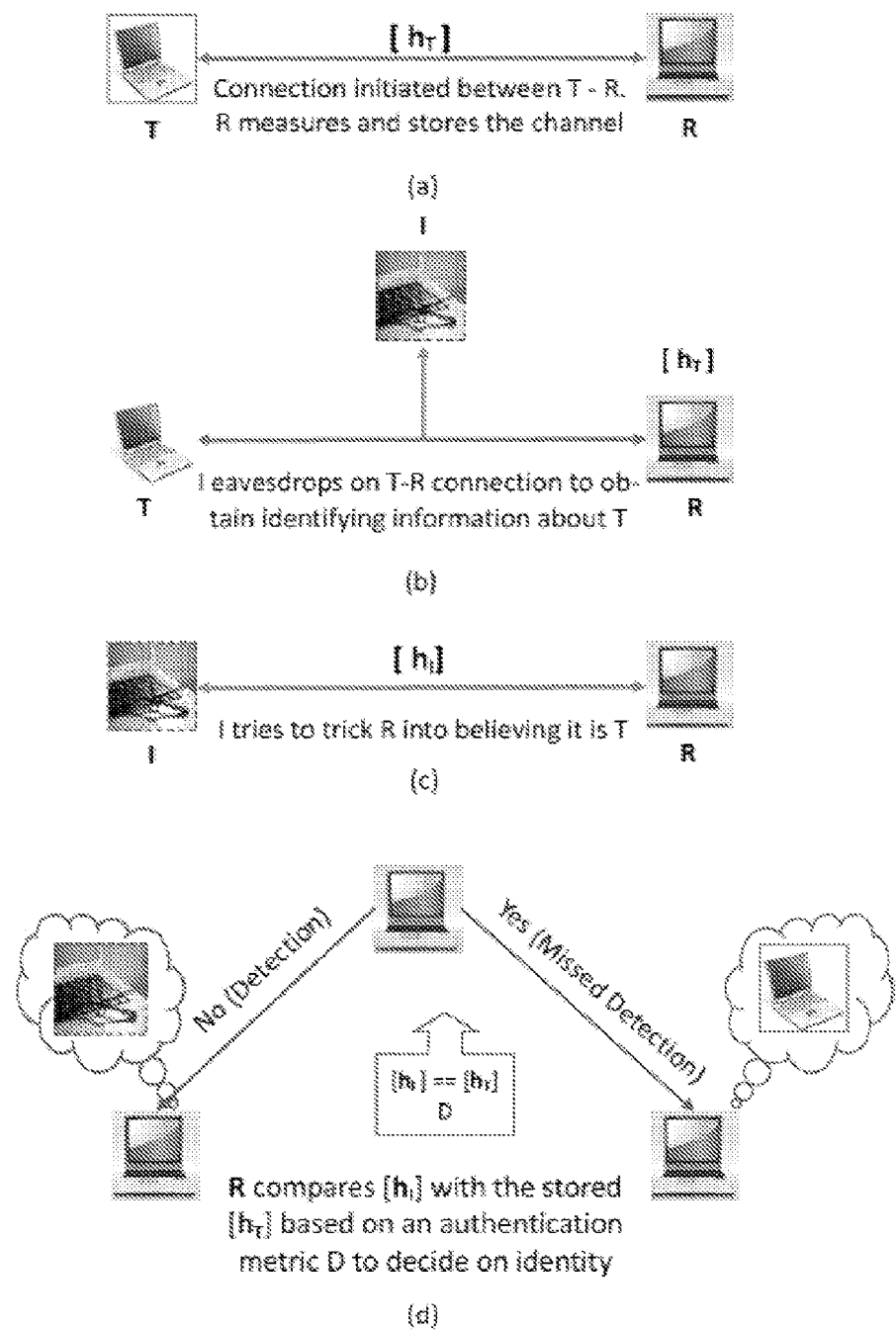
FIG. 1 illustrates different stages during the evolution of the authentication problem during a data transfer session between transmitter T and receiver R that is monitored by an intruder I.

The present invention may be understood more readily by reference to the following detailed description taken in connection with the accompanying figures and examples, which form a part of this disclosure. It is to be understood that this invention is not limited to the specific products, methods, conditions or parameters described and/or shown herein, and that the terminology used herein is for the purpose of describing particular embodiments by way of example only and is not intended to be limiting of any claimed invention. Similarly, any description as to a possible mechanism or mode of action or reason for improvement is meant to be illustrative only, and the invention herein is not to be constrained by the correctness or incorrectness of any such suggested mechanism or mode of action or reason for improvement. Throughout this text, it is recognized that the descriptions refer both to methods and hardware/software for implementing such methods.

A detailed description of illustrative embodiments of the present invention will now be described with reference to FIGS. 1-23. Although this description provides a detailed example of possible implementations of the present invention, it should be noted that these details are intended to be exemplary and in no way delimit the scope of the invention.

System Overview

The invention described herein addresses the dual problems of authentication and intrusion detection is wireless networks. As will be explained below, the invention addresses these problems by providing methods for device authentication and intrusion detection in MIMO systems using multi-element reconfigurable antennas. While techniques for authentication and intrusion detection are described in different embodiments for ease of description, those skilled in the art will appreciate that the respective methods and schemes described herein may be combined into the same wireless transmission system as desired.

Authentication Scheme for Wireless Networks

The authentication scheme used in a first exemplary embodiment of the invention is based on the basic idea that the channel between the legitimate transmitter and receiver is difficult to replicate by a malicious entity. Different modes in a reconfigurable antenna present different views of this channel. As a result, emulating all the channels seen by the different modes becomes a more difficult proposition for the intruder. Therefore, associating a device with a unique channel based identifier or fingerprint could yield a robust authentication mechanism. This identifier utilizes the raw complex channel information rather than any abstracted power based metrics such as RSSI, which allows the scheme to be more robust to attacks that try to circumvent it through simple power control. Moreover, the inventive method does not attempt to localize the transmitting device. Rather, the inventive method finds a unique identifier for each transmitting device in the network based on its location. A data packet that generates the proper location fingerprint at the receiver can be then trusted to be arriving from the legitimate user and vice versa.

The problem scenario consists of three different players: a receiver (R), a transmitter (T) and an intruder (I). In practice R could correspond to a wireless access point while T and I correspond to two users trying to connect to R. In practice, it is more likely that a wireless access point would be equipped with a comprehensive reconfigurable antenna system due to space and cost constraints. Therefore, it is assumed that a reconfigurable antenna with N different configurations is employed only at R with T and I equipped with conventional omni-directional antennas.

The problem evolves as shown in FIG. 1. As shown, T and R initiate a connection at the outset of the session and are in the process of exchanging information (FIG. 1(a)). At this stage, R measures and stores the channel between itself and T for N different antenna modes. I starts monitoring this exchange during this session until it obtains the identifying information corresponding to T (FIG. 1(b)). After obtaining this information, I tries to pose as T to mislead R (FIG. 1(c)). The goal is now to enable R to distinguish between T and I at the physical layer based on the stored channel information. R makes this distinction by comparing the estimated channels for the N antenna modes for the incoming packet with the most recent copy stored in memory (FIG. 1(d)). Based on the outcome of this test, R makes a decision on whether the packet arrived from T or not. It is assumed that R performs this comparison periodically and holds the most recent copy of the channel information that passes the test in its memory for the next comparison.

Channel Model

Unlike mobile phone based services, a multitude of current and emerging wireless data services involve stationary terminals at both ends of the link. The terminal locations are usually fixed or movements are localized to a very small area near the seated user for the duration of a session. Temporal variations in such channels, termed as nomadic mobility channels, mostly arise due to movements of people and objects in the vicinity of the terminals. The description herein is limited to such channels since they represent a more common usage scenario for current high data rate applications.

For a fixed link, the directional channel impulse response for an environment with L clusters and K rays per cluster is given by:

$$h(\phi_R, \phi_T) = \frac{1}{\sqrt{LK}} \sum_{l=0}^{L-1} \sum_{k=0}^{K-1} \beta_{kl} \delta(\phi^T - \phi_{kl}^T) \delta(\phi^T - \phi_{kl}^R) \quad (1)$$

where $\phi^T$ and $\phi^R$ are the transmit and receive angles, $\beta_{kt}$ is the complex ray gain of the kth ray in the lth cluster, and $\phi_{kt}^T$ and $\phi_{kt}^R$ are their corresponding angles of departure and arrival. The narrowband channel impulse response corresponding to this cluster model is given by:

$$h = \int_{-\pi}^{\pi} \int_{-\pi}^{\pi} G_R(\phi^R) h(\phi_R, \phi_T) G_T(\phi^T) d\phi^T d\phi^R \quad (2)$$

where $G_R(\phi^R)$ and $G_T(\phi^T)$ are the antenna gain patterns at the receiver and transmitter, respectively. If it is assumed that an omni-directional radiation pattern is provided at the transmitter, substituting equation (1) in equation (2) simplifies to:

$$h = \frac{1}{\sqrt{LK}} \sum_{l=0}^{L-1} \sum_{k=0}^{K-1} \beta_{kl} G_R(\phi_{kl}^R) \quad (3)$$

For a sufficiently narrowband channel, flat fading can be assumed, and h will be given by a single complex number with |h| distributed according to a Rayleigh or Ricean distribution. Equation (3) quantifies the dependence of h on the antenna configuration at the receiver. For the kth receiver antenna configuration $G_k(\phi^R)$, the corresponding channel is denoted by $h_k$.

Figure 2:
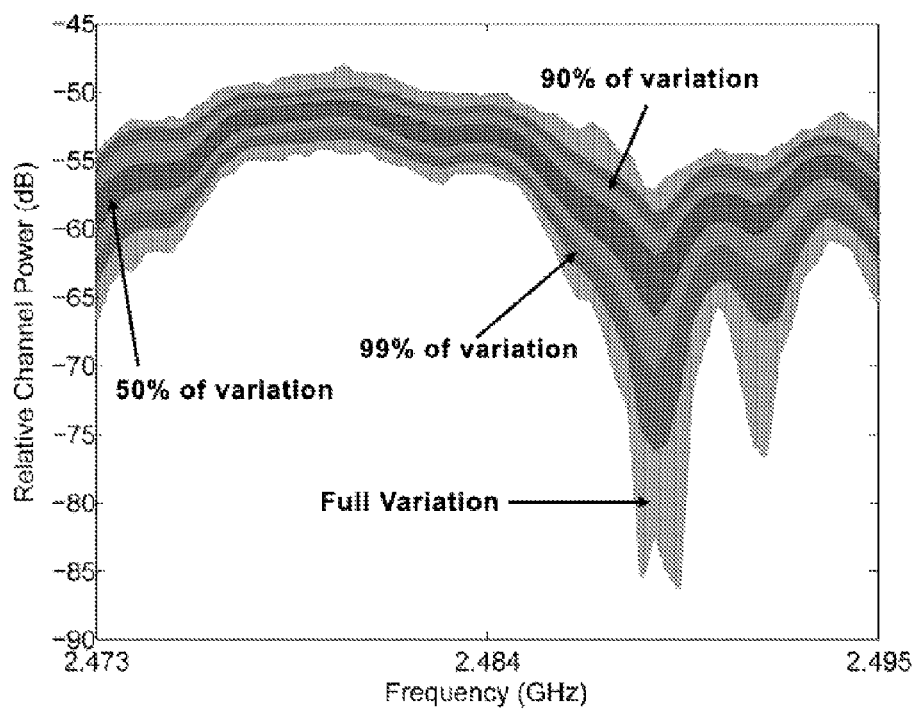
FIG. 2 illustrates the temporal variation in channel frequency response for a single link with a single antenna configuration over a period of 6 hours.

Previous measurement campaigns on nomadic mobility channels have shown that, for stationary terminals, the temporal channel variations are imparted primarily due to shadowing and scattering by the moving scatterers in the vicinity of the link. See, e.g., J. Medbo, J.-E. Berg, and F. Harrysson, "Temporal radio channel variations with stationary terminal," in *Vehicular Technology Conference, 2004. VTC2004-Fall. 2004 IEEE 60th*, vol. 1, 2004, pp. 91-95; P. Pagani and P. Pajusco, "Characterization and modeling of temporal variations on an ultrawideband radio link," *Antennas and Propagation, IEEE Transactions on*, vol. 54, no. 11, pp. 3198-3206, 2006; and C. Oestges, D. Vanhoenacker-Janvier, and B. Clerckx, "Channel characterization of indoor wireless personal area networks," *Antennas and Propagation, IEEE Transactions on*, vol. 54, no. 11, pp. 3143-3150, 2006. FIG. 2 shows the temporal variation in the measured frequency response corresponding to a single link for a single antenna mode. The entire shaded region constitutes the total power variation in the channel over a period of approximately 6 hours during regular working hours when there was considerable human movement between the two ends of the link. The results follow similar trends that have been reported in earlier measurements where most of the variations are confined to narrow regions. See Medbo et al. Consistent with the models proposed in these earlier works, the channel may be modeled as follows:

$$\hat{h}_k = X h_k + \epsilon + n \quad (4)$$

where X denotes the shadowing imposed on the time invariant component $h_k$. $\epsilon$ is the additional small scale fading component induced by the scatterers, and n denotes receiver noise. $\epsilon$ and n can be modeled as a complex Gaussian process with 0 means and variances $\sigma_\epsilon^2$ and $\sigma_N^2$ respectively. X is modeled as a random variable with a log-normal distribution with 0 mean and variance $\sigma_s^2$.

Identification Metric and Identity Test

In order to perform the channel comparison, R would require an authentication metric based on the channel information. The metric corresponding to the two channel realizations can be then used to make a decision about the transmitter's identity. One can start with a decision vector that is given by:

$$\hat{h} = [|\hat{h}_k| |\hat{h}_2| \ldots \hat{h}_N|]^T \quad (5)$$

where $\hat{h}$ is a vector that consists of channel amplitudes corresponding to different receiver antenna modes. The vector $\hat{h}$ can be considered as the spatial signature or fingerprint associated with a terminal at a particular location. The angle between two spatial signatures $\hat{h}_i$ and $\hat{h}_l$ in the N dimensional space is now proposed as the test statistic to test if the signatures correspond to the same terminals:

$$\theta = \cos^{-1} \left( \frac{\hat{h}_i \cdot \hat{h}_l}{\|\hat{h}_i\| \|\hat{h}_l\|} \right) \quad (6)$$

where i and l denote the packet indices whose corresponding channel vectors are compared. Other candidates for a test statistic include Euclidean distance between the channels, as described by D. B. Faria and D. R. Cheriton, "Detecting identity-based attacks in wireless networks using signal prints," in *WiSe '06: Proceedings of the 5th ACM workshop on Wireless security*. New York, N.Y., USA: ACM, 2006, pp. 43-52; N. Patwari and S. K. Kasera, "Robust location distinction using temporal link signatures," in *MobiCom '07: Proceedings of the 13th annual ACM international conference on Mobile computing and networking*. New York, N.Y., USA: ACM, 2007, pp. 111-122; L. Xiao, L. Greenstein, N. Mandayam, and W. Trappe, "Fingerprints in the ether: Using the physical layer for wireless authentication," in *Communications, 2007. ICC '07. IEEE International Conference on*, June 2007, pp. 4646-4651; and "Channel-based spoofing detection in frequency-selective Rayleigh channels," *Wireless Communications, IEEE Transactions on*, vol. 8, no. 12, pp. 5948-5956, 2009, and difference in total channel power. However, the angle based statistic has two properties that make it attractive for a reconfigurable antenna based authentication scheme. Depending on the environmental conditions, channels from certain modes may be stronger than the others. Such stronger channels tend to dominate the value of the computed test statistic in distance or power based metrics, rendering the information contained in the weaker channels useless. However, the angle based test statistic weights channels from all the modes equally, resulting in better utilization of all the available information. The support of the test statistic is naturally limited (0°≤θ≤360°) and hence smoother distribution functions can be formed with a limited number of training samples. This same property will also be desirable when offline learning techniques based on standard wireless channel models are employed to train the system.

Since the test statistic is the angle between the two spatial signatures, the vectors can be normalized without altering its value. Therefore, θ can now be written as:

$$\theta = \cos^{-1}(\hat{h}_i \cdot \hat{h}_l) \quad (7)$$

$$= \cos^{-1}\left(\sum_{n=1}^{N} |\bar{h}_{ni}||\bar{h}_{nl}|\right) \quad (8)$$

where $$\bar{h}_i = \frac{\hat{h}_i}{\|\hat{h}_i\|}$$

and $\bar{h}_{ni}$ denotes the elements of the normalized vector. Moreover, a bar denotes the modified quantity after normalization in the proceeding discussion.

The duration of shadowing is long compared to the packet transmission times and considered to be constant for all antenna configurations at any channel estimation period. Therefore, at time instant i, the channel corresponding to a terminal is given by:

$$\bar{h}_i = \begin{bmatrix} |\bar{X}_i \bar{h}_{i1} + \bar{\epsilon}_{i1} + \bar{n}_{i1}| \\ |\bar{X}_i \bar{h}_{i2} + \bar{\epsilon}_{i2} + \bar{n}_{i2}| \\ \vdots \\ |\bar{X}_i \bar{h}_{iN} + \bar{\epsilon}_{iN} + \bar{n}_{iN}| \end{bmatrix} \quad (9)$$

From equations (9) and (8), the angle between this vector and another spatial signature at time instant l is given by:

$$\theta = \cos^{-1}\left(\sum_{n=1}^{N} |\bar{X}_i \bar{h}_{in} + \bar{\epsilon}_{in} + \bar{n}_{in}||\bar{X}_l \bar{h}_{ln} + \bar{\epsilon}_{ln} + \bar{n}_{ln}|\right) \quad (10)$$

where $\bar{X}_i \bar{h}_{in} + \bar{\epsilon}_{in} + \bar{n}_{in}$ involves the sum of a lognormal random variable and a normal random variable for which a tractable closed form pdf expression does not exist. Therefore, empirical density functions for θ obtained from measurements will be used in the analysis.

Previous studies (e.g. Medbo) have shown that the variable component ε is usually between 20 and 50 dB lower than the static component for a majority of the time. Therefore, for a simpler case where |ε+n|<<|Xh|, $\hat{h}_n$ can be written as:

$$\hat{h}_n \cong Xh_n \quad (11)$$

and $$h_i = X_i[|h_{i1}||h_{i2}| \ldots |h_{iN}|] \quad (12)$$

Normalizing $h_i$ removes the effect of $X_i$ and can be written as:

$$\bar{h}_i = [|\bar{h}_i i1| \; |\bar{h}_i i2| \; \ldots \; |\bar{h}_i iN|] \quad (13)$$

and $$\theta = \cos^{-1}\left(\sum_{n=1}^{N} |\bar{h}_{in}||\bar{h}_{1n}|\right) \quad (14)$$

which is the 'true' angle between the two channels corresponding to the two locations from which packets i and l originated.

Given the authentication metric θ, the problem of classifying the transmitter now becomes a hypothesis testing problem. The null hypothesis $H_D$ is picked to be that the incoming packet is from the same legitimate transmitter T and the alternate hypothesis $H_i$ to be otherwise. Denoting the transmitter corresponding to $h_i$ as $T(h_i)$, the test can be written as:

$$H_D: T(h_i) = T(h_l) \quad (15)$$

$$H_1: T(h_i) \neq T(h_l) \quad (16)$$

The conditional probability distributions of the authentication metric θ and the corresponding cumulative distribution functions may be denoted as follows:

$$H_1 0: p_1 \theta(d|H_1 0), (_j 0(\theta)) \quad (17)$$

$$H_1 1: p_1 \theta(d|H_1 1), (_j 1(\theta)) \quad (18)$$

For a given false alarm rate α, a threshold λ can be found such that:

$$\alpha = p_\theta(\theta > \lambda | H_0) \quad (19)$$

$$= 1 - (_1 0(\lambda)) \quad (20)$$

$$\Rightarrow \lambda = (_1 0^T(-1)(1-\alpha) \quad (21)$$

The probability of missed detection β can be defined for this threshold as:

$$\beta = p(\theta < \lambda | H_1) = (_i 1[<("(">],0'(-1)(1-\alpha)) \quad (22)$$

For a given authentication metric or θ, estimates for α and β may now be formed.

Measurement Setup and Reconfigurable Antenna

Figure 3:
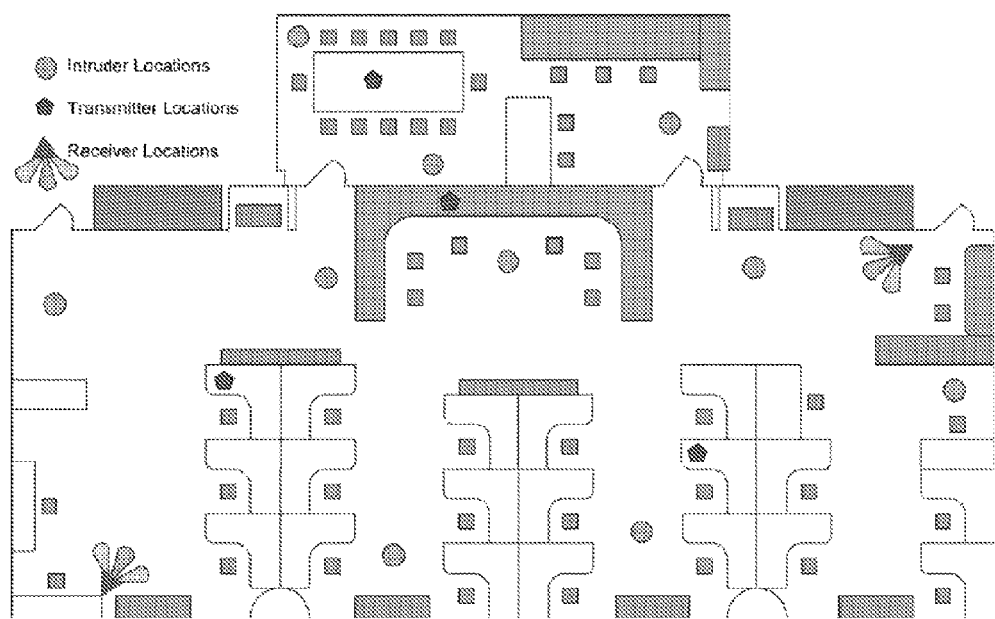
FIG. 3 illustrates a CAD model of sample layout of a measurement environment for the indicated test locations of R, T, and I.

Channel measurements to evaluate the performance of the reconfigurable antenna based user identification scheme of the invention were performed using a four port vector network analyzer (VNA) (Agilent N5230A) by measuring $S_{21}$ between the transmitter and receivers. The location chosen for the measurements was a medium sized laboratory on Drexel University campus. The laboratory is 20 m long, 8 m wide, and 4 m high. The lab has a back room separated from the main lab by a plaster wall and several cubicles segmented by metallic walls and has other typical laboratory furniture, electronic equipment, and cabling scattered throughout the room. The measurement layout and setup is shown in FIG. 3. Transmitter T and intruder I locations were chosen so that there were a combination of both line-of-sight (LOS) and non-line-of-sight (NLOS) links. Receiver R was equipped with the reconfigurable antenna to be described below. T and I were equipped with omnidirectional whip antennas. The antenna at the receiver was mounted at a height of 2.5 m while the antennas at the transmitters were mounted at the desk level of approximately 0.75 m.

The frequency was swept over a 22 MHz bandwidth centered at 2.484 GHz which corresponds to channel 14 of the IEEE 802.11n standard. 64 evenly spaced frequency samples were measured over this bandwidth. Two locations for R and four locations for T were chosen yielding a total of eight links. For each of these links, ten different I locations were considered. For each (R,T,I) pair, channels corresponding to the T-R and I-R links were measured for 5 different antenna configurations at R every 10 seconds for a total of 1000 samples. The time to complete each sweep was automatically set by the VNA to 130 msec. Due to speed limitations in the control board for changing antenna modes, a 0.25 second delay was introduced while switching between different antenna modes. Measurements were taken over several days during both morning and evening hours when the human traffic was moderate and low, respectively.

Figure 4:
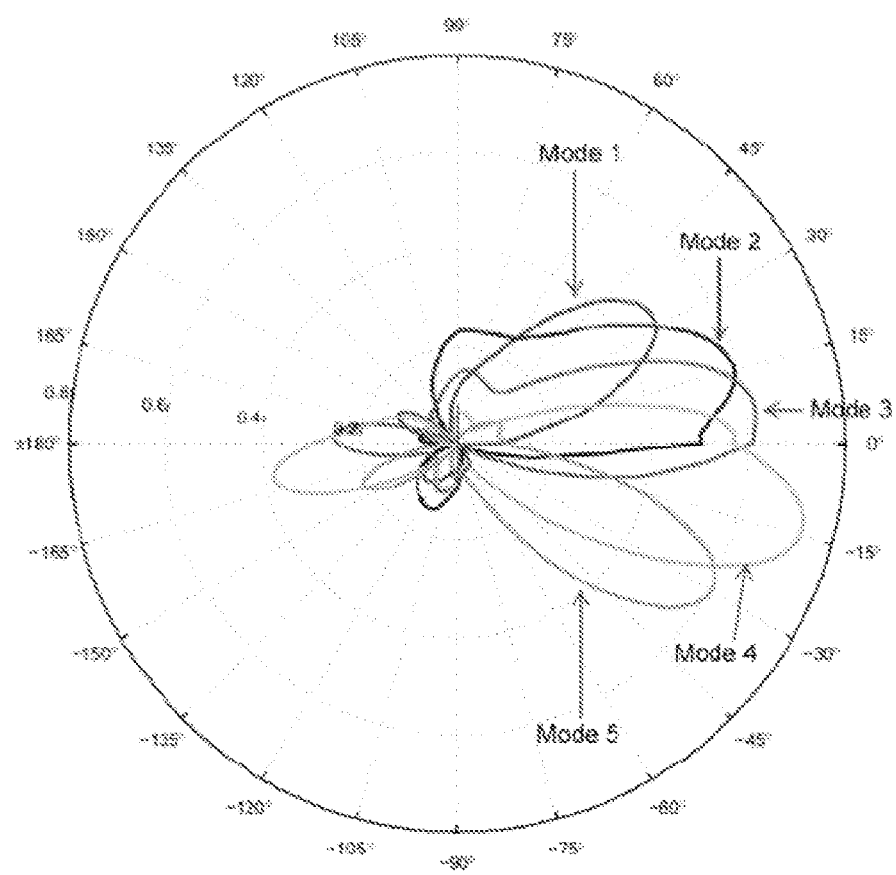
FIG. 4 illustrates radiation patterns of the LWA in the elevation plane (corresponding to the plane of the 2D model of FIG. 3) for 5 different configurations where the patterns are vertically polarized for all modes.

The reconfigurable antenna used in the experimental setup is a two-port microstrip composite right/left-hand (CRLH) transmission line leaky wave antenna (LWA) which is an antenna design inspired by meta-material transmission lines. See, e.g., D. Piazza, M. D'Amico, and K. Dandekar, "Performance improvement of a wideband MIMO system by using two-port RLWA," *Antennas and Wireless Propagation Letters, IEEE*, vol. 8, pp. 830-834, 2009. Pattern reconfiguration in this antenna is achieved by varying the right and left handed capacitances of a leaky CRLH transmission line by means of varactor diodes placed on the structure. The phase constant of the unit cells that constitute the antenna is changed by varying the bias voltage on the varactor diodes which results in beams directed in different directions for a fixed frequency of operation. The patterns in the elevation plane for the five modes used in this study are shown in FIG. 4. The choice of this antenna is justified by its ability to electrically steer the antenna beam while having a significantly compact form factor.

Channel Correlation

The N elements of the decision vector $\hat{h}$ correspond to channels estimates for the different antenna modes used in the reconfigurable antenna (i.e., this scheme is based on exploiting pattern diversity). However, a similar scheme could be devised by utilizing channel coefficients corresponding to N different frequencies (frequency diversity), or spatial snapshots (spatial diversity). The amount of correlation that exists between the elements in $\hat{h}$ for different diversity schemes will now be empirically quantified.

The pattern correlation coefficient between radiation patterns corresponding to antenna modes i and j is defined as:

$$(23) \quad (^{2} tin\ K\ _{e}V\ E_{L}I\ 0_{,}) \tag{23}$$

where $E_i(\Omega)$ is the radiation pattern for the ith mode and † denotes complex conjugation. The correlation coefficients generated by this definition between azimuthal patterns for five different modes are listed in Table I.

TABLE I

Pattern correlation coefficients between different modes of the LWA

| | Mode 1 | Mode 2 | Mode 3 | Mode 4 | Mode 5 |
|---|---|---|---|---|---|
| Mode 1 | 1 | 0.73 | 0.42 | 0.10 | 0.06 |
| Mode 2 | 0.73 | 1 | 0.82 | 0.27 | 0.07 |
| Mode 3 | 0.42 | 0.82 | 1 | 0.55 | 0.11 |
| Mode 4 | 0.10 | 0.27 | 0.55 | 1 | 0.56 |
| Mode 5 | 0.06 | 0.07 | 0.11 | 0.56 | 1 |

Figure 5:
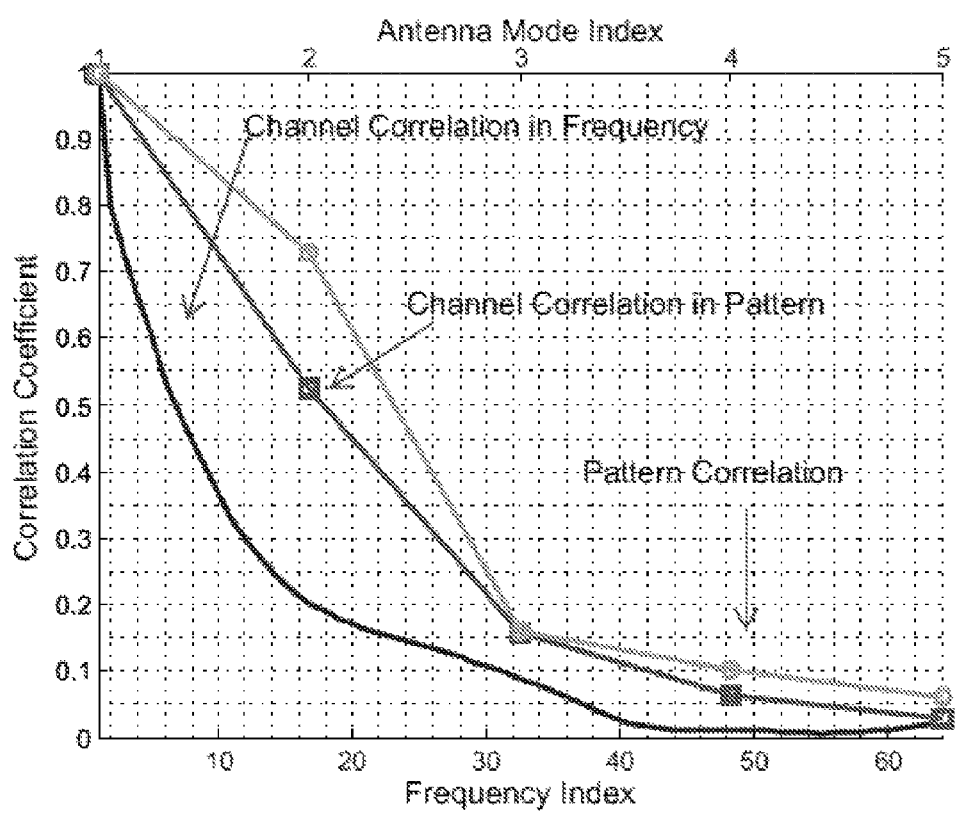
FIG. 5 illustrates pattern and channel correlation coefficients where the upper X axis corresponds to indices of antenna modes and lower X axis corresponds to indices of different frequencies. Correlations are defined with respect to mode 1 and the first measured frequency, respectively.

Channel correlation coefficients with respect to the first antenna mode, averaged over the eight T-R links, are shown in FIG. 5. The first row of Table I is superimposed on FIG. 5 to illustrate the influence of pattern correlation on the resulting channel correlations. FIG. 5 follows the conventional wisdom that uncorrelated patterns lead to uncorrelated channels in rich multipath environments. The channel correlation coefficients with respect to the first measured frequency for the other frequencies are also shown in FIG. 5. This result agrees with well-known published results as well. However, of interest to the inventors is the comparison between the correlations arising from pattern and frequency correlations.

In the measured environment, approximately a 5 MHz frequency separation was required to achieve a correlation factor of 0.2 and 11 MHz separation for 0.1. However, relying on frequency separation for channel decorrelation presents two problems. The first problem is that it is not straightforward to estimate the frequency separation required for a given level of decorrelation without proper knowledge of the RMS delay spread of the environment. Second, most wireless systems are band limited and the ability to span the frequency axis to achieve a required level of decorrelation may not be possible for many applications. On the other hand, using pattern diversity for applications requiring decorrelated channel realizations is a more 'controlled' approach where antenna modes can be designed to exhibit a certain level of decorrelation which will translate to a similar level of decorrelation in the realized channels. For example, with just two modes (mode 1 and 5), the inventors are able to achieve correlation levels of less than 0.05. These correlation trends will serve to gain insights on some of the results to be discussed below.

Numerical Results

The measurements gathered as described above were analyzed to quantify the performance of the reconfigurable antennas based authentication scheme of the invention. For a given N, α and β were obtained as follows:

1) Pick a (R, T, I) combination and a frequency.
2) Pick N adjacent antenna modes (e.g., for N=3 possible selections are (1,2,3), (2,3,4), and (3,4,5)). $\hat{h}$'s used in the following steps are formed by stacking the channels corresponding to the modes present in this combination.
3) Compute $p_\theta(\theta|H_n)$ by gathering θ's corresponding to T-R's $\hat{h}$ at time instants i and i+1 (1≤i≤999).
4) For different a determine the corresponding from this distribution.
5) Compute $p_\theta(\theta|H_1)$ by gathering θ corresponding to T-R $\hat{h}$ at time instant i−1 and I-R $\hat{h}$ at time instant i (2≤i≤1000).
6) From the different λ computed in step (3), determine the corresponding miss rate β.
7) Repeat steps (3-6) for all possible mode combinations.
8) Repeat steps (2-7) for all possible (R, T, I) combinations.
9) β is averaged over all the possible combinations repeated in steps (7) and (8). Similarly, for frequency diversity, different antenna modes instead of frequencies are picked in step (1) and N adjacent frequencies are chosen instead of antenna modes in step (2).

Figure 6:
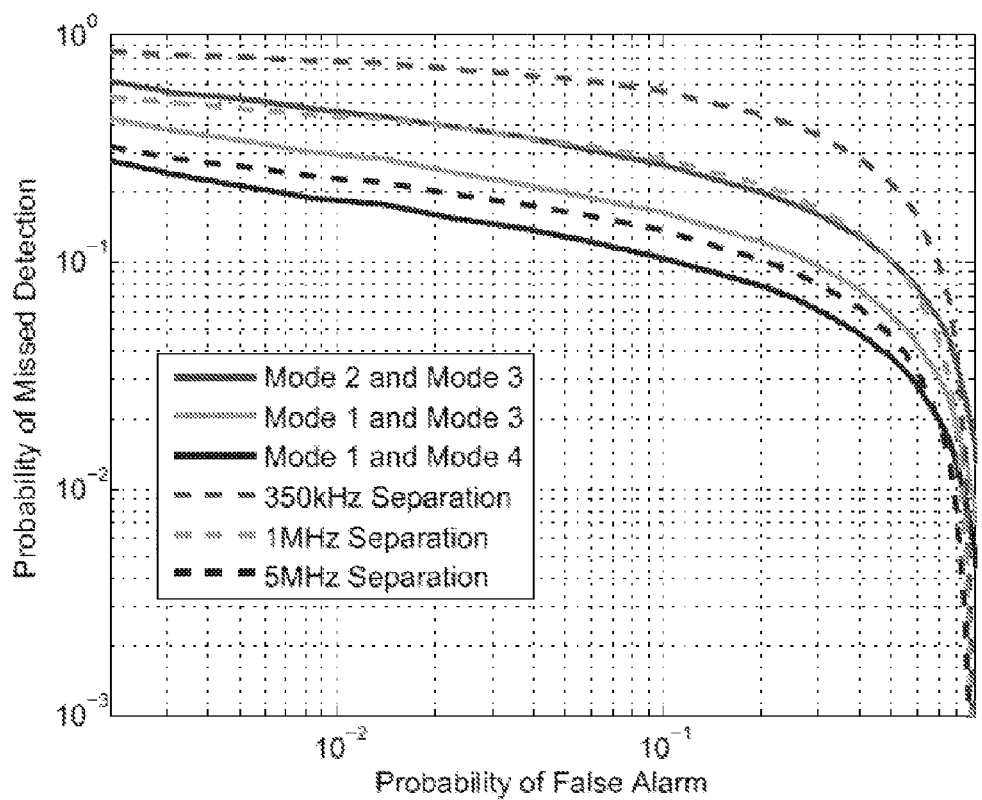
FIG. 6 illustrates $\beta$ as a function of a for pattern and frequency diversity for N=2. (The remaining 7 pairs for pattern diversity follow similar trends and were omitted to avoid clutter in the figure.)

FIG. 6 shows the ROCs obtained for three different mode pairs (out of ten possible pairs) when two modes are used for authentication. The worst performing mode corresponds to the mode pair of (2,3). This pair can be seen to have the highest pattern correlation from Table I. The best performing mode corresponds to the mode pair (1,4) which is near the lowest correlation level observed among the radiation patterns. Similar trends can be observed when frequency diversity is employed as well. However, large frequency separations (more decorrelation) are required between the frequency points used to obtain good performance.

The reason for the detection rate dependence on the correlation between the elements in $\hat{h}$ can be explained as follows. Assume two modes or frequencies are highly correlated. Due to environmental conditions or by deliberate manipulation (such as transmit power control, trying out different locations, etc.), the intruder's channel corresponding to one mode may fall close to that of the legitimate transmitter. Now the probability of the other mode to fall close to that of the transmitter is also increased due to the high correlation and thus the addition of the new mode does not increase the quality of the spatial signature contained in $\hat{h}$. However, if the modes are decorrelated, the ability for another user to accidentally or intentionally match all the channels of another user becomes probabilistically more difficult. Thus, more decorrelated elements in the decision vector $\hat{h}$ lead to improvement in detection rates. It is therefore clear that higher levels of pattern correlation impede performance and hence the different antenna modes used in the scheme should have low decorrelation between them.

Figure 7:
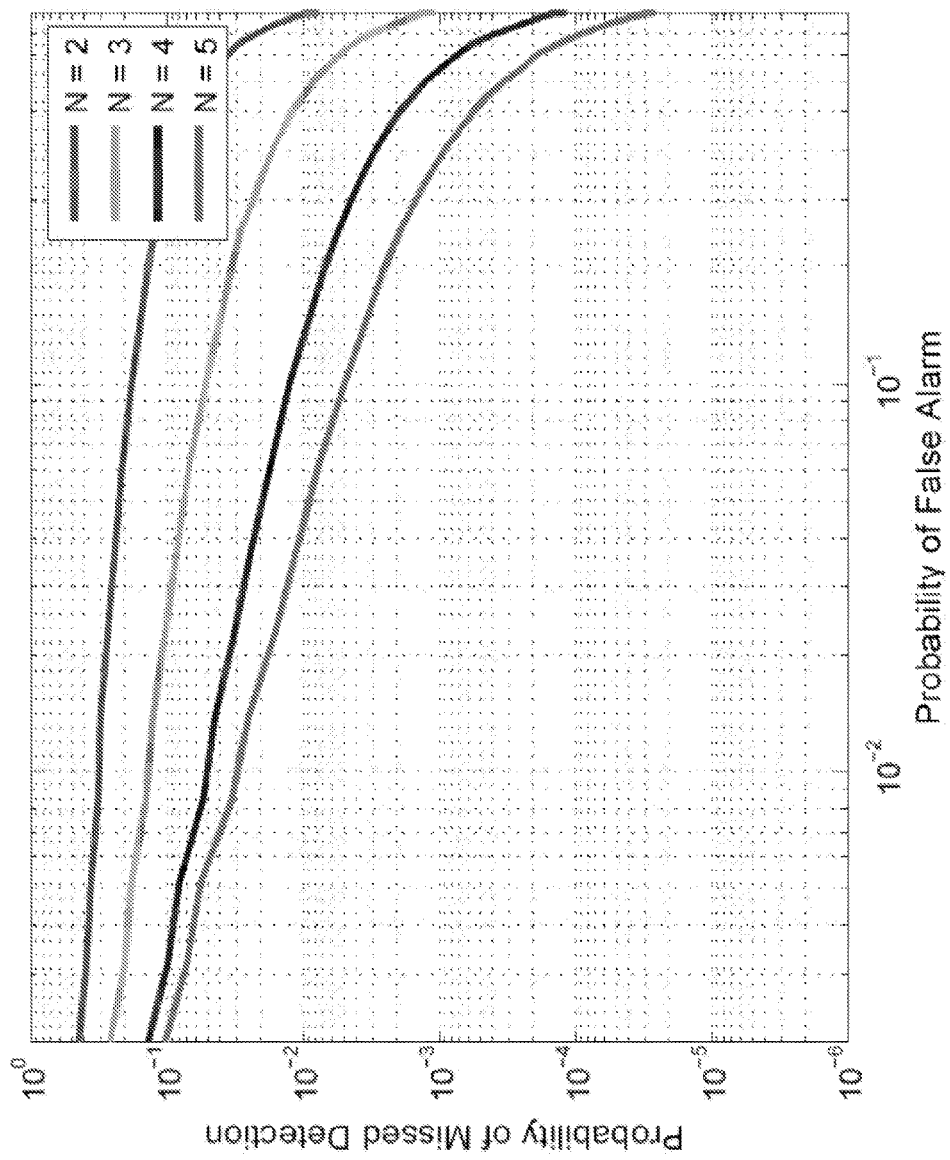
FIG. 7 illustrates $\beta$ as a function of a for reconfigurable antenna based authentication at different values of N.

FIG. 7 shows the performance of the pattern diversity based scheme in detecting intruders for different values of N. For an $\alpha$ of 1%, $\beta$ decreases from 30% to 3% when N is increased from 2 to 5. For a given $\alpha$, $\beta$ decreases with N. As N grows higher, the probability for the intruder channel to closely match all the channel elements in $\hat{h}$ such that $\theta$ falls below threshold $\lambda$ and becomes low and hence the detection rate improves.

It can be observed that the improvement in performance starts to reduce as N is increased. For example, for an $\alpha$ of 1%, $\beta$ improves by 15% when N goes from 2 to 3. This improvement reduces to 2% when N increases from 4 to 5. Introducing an additional mode into $\hat{h}$ does not necessarily keep the average inter-element correlation at the same level before its introduction due to the different levels of correlation that exists between different modes. Due to the limited number of modes used in the study, this is especially true for higher N ($\geq 4$) since $\hat{h}$ consists of highly correlated modes and their contribution to the detection rate is only minimal. Hence, it can be observed that there are diminishing returns in performance improvement as the number of modes increases. To demonstrate this effect, frequency diversity is used where the multiple elements in $\hat{h}$ are picked to have low correlation between each other and the average correlation does not change when a new element is introduced. Frequencies are picked that are separated by 5 MHz (resulting channel correlation <0.2 from FIG. 5) for different values of N.

Figure 8:
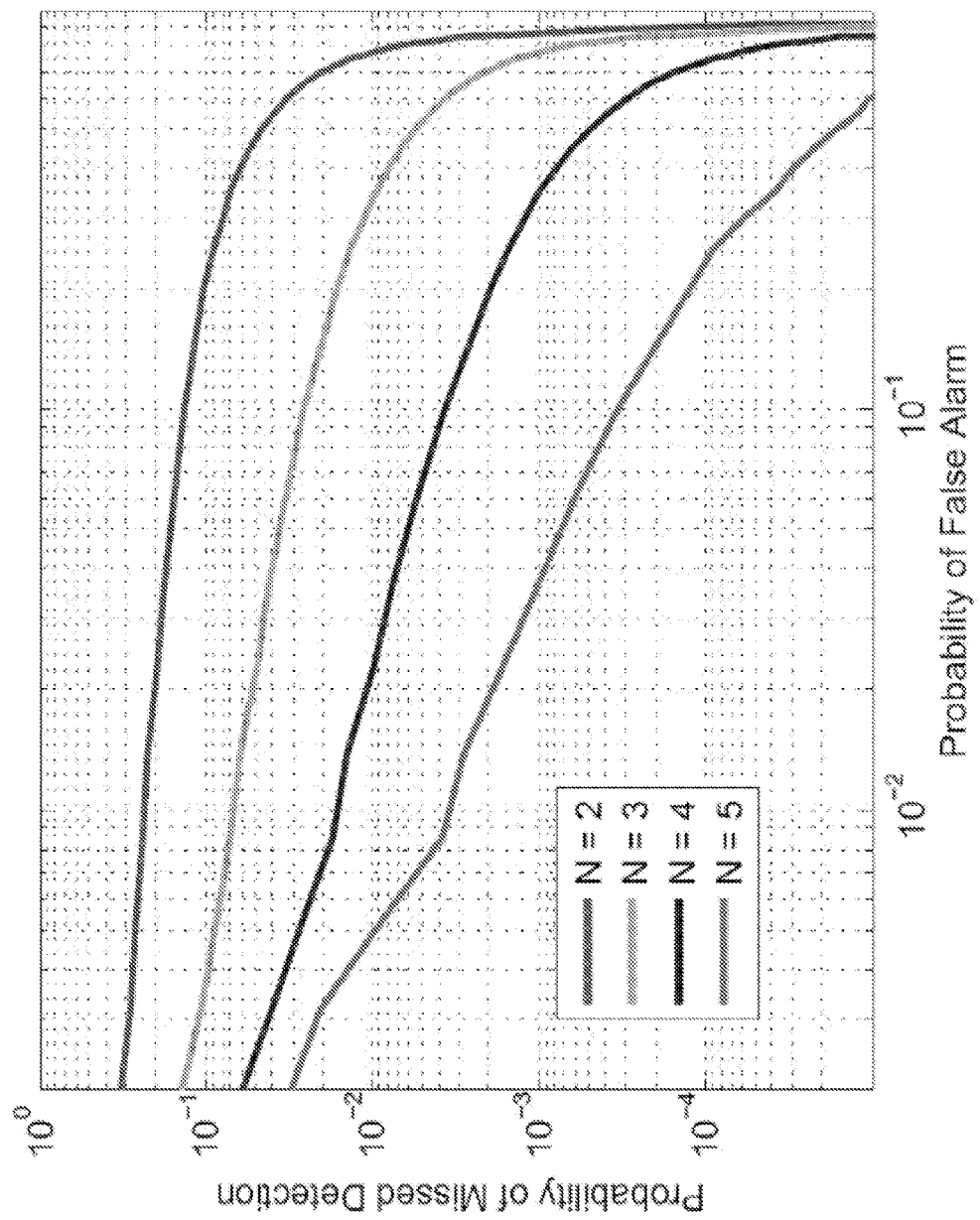
FIG. 8 illustrates $\beta$ as a function of a when the average correlation between different elements in ĥ remains the same with increasing N, where elements correspond to frequency points spaced at 5 MHz.

FIG. 8 shows the resulting ROCs which indicates that as long as the average correlation among the elements is not diminished, introducing new modes or frequencies in $\hat{h}$ will maintain the rate of improvement in detection rates. However, this phenomena should not discourage the use of a reconfigurable antenna based solution since a multitude of reconfigurable antenna geometries exist that can generate several modes with very low correlation amongst all their patterns. See, e.g., D. Piazza, P. Mookiah, M. D'Amico, and K. Dandekar, "Experimental analysis of pattern and polarization reconfigurable circular patch antennas for MIMO systems," *Vehicular Technology, IEEE Transactions on*, vol. 59, no. 5, pp. 2352-2362, June 2010.

Figure 9:
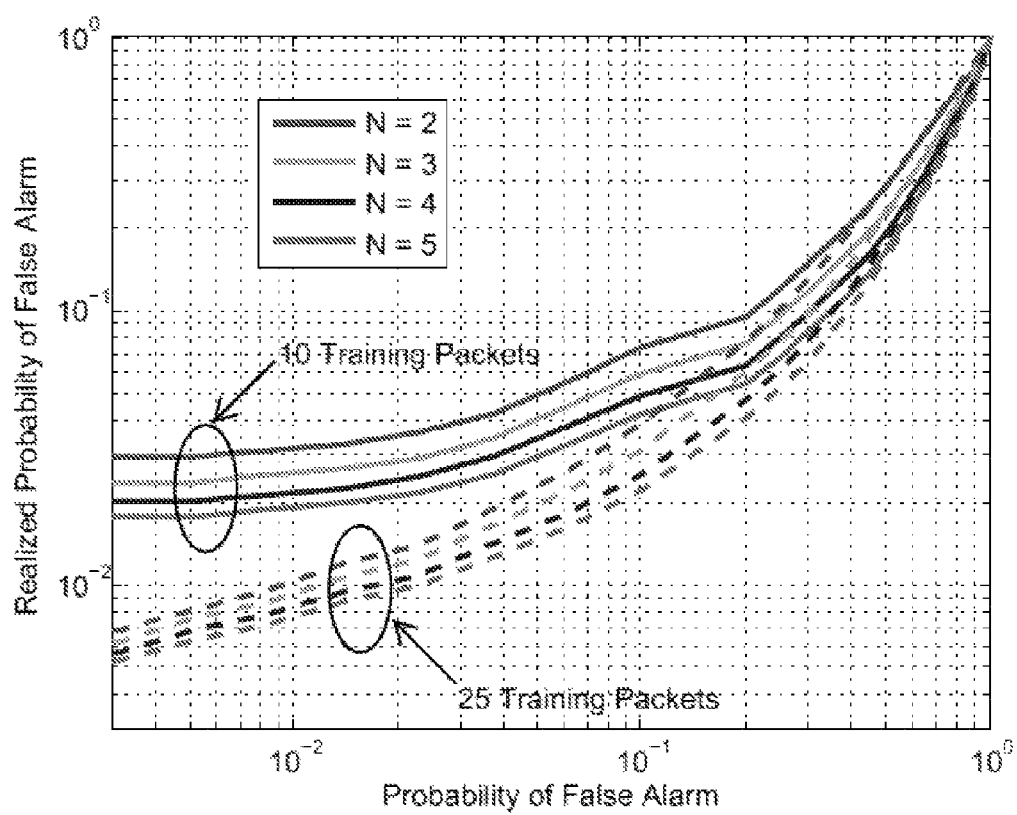
FIG. 9 illustrates realized false alarm rates as a function of designed false alarm rates during an online mode of operation.
Figure 10:
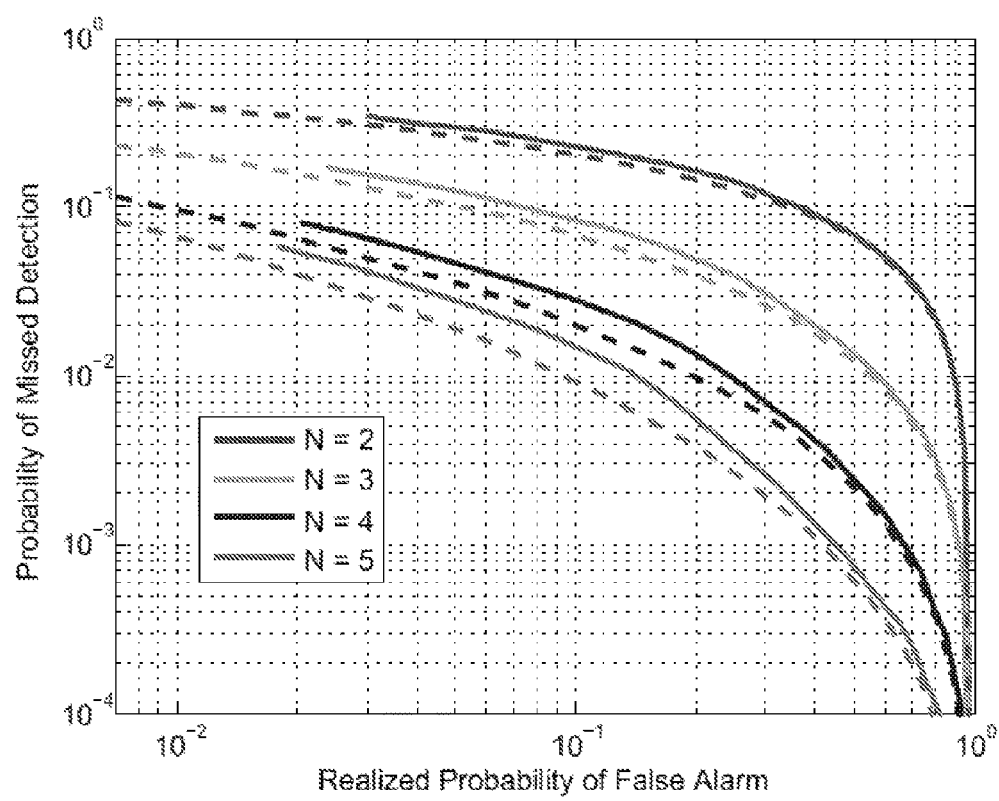
FIG. 10 illustrates $\beta$ as a function of realized a during online operation. Solid lines correspond to 10 training packets and dashed lines correspond to 25 training packets.

Finally, the performance of this scheme when operating in an online mode was analyzed. The number of samples from T used for initially estimating $p_\theta(\theta\theta|H_n)$ is denoted by $N_{T-\theta}$ corresponding to all the $N_T(N_T-1)/2$ samples used for forming this distribution from which $\lambda$ was computed for different $\alpha$. The most recent channel estimate to pass the authentication process was held in memory for the next test. FIG. 9 shows the realized $\alpha$ during this online operation for two different values of $N_T$. It can be observed that more training leads to good performance. ROCs with respect to the achieved $\alpha$ is shown in FIG. 10. The observed trends are comparable to that of the loose upper bound for performance obtained from the offline mode of analysis shown in FIG. 7.

Figure 11:
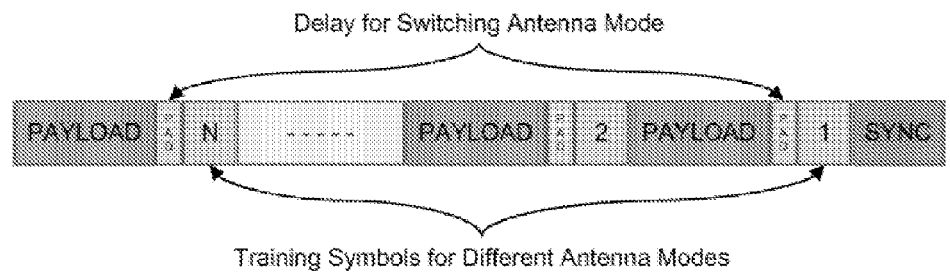
FIG. 11 illustrates an extended transmit frame that can be used to obtain channel estimates for multiple antenna modes during a single packet transmission.

A key issue relates to how the channel estimates can be obtained for all the different modes without degrading throughput and power consumption. FIG. 11 shows a possible structure of a transmit frame for use with this security scheme. The antennas can cycle through the modes during the transmission of an extended packet during which the channel estimation is also performed for the different modes. Padding is inserted between the payload and next training sequence to leave sufficient time for the antenna to change modes. Switches with speeds on the order of picoseconds do exist currently and can lead to shorter pad lengths required while switching between modes.

Thus, a reconfigurable antenna based physical layer authentication scheme is provided in accordance with a first embodiment of the invention by taking channel measurements on a VNA and combining channel information from different antenna configurations. The resulting configuration has been shown to result in improved intruder detection. The relationship between the correlation among the elements in the decision metric and the authentication performance shows that the achieved performance improves as the average decorrelation that exists between the different antenna modes decreases. By choosing modes that are highly decorrelated, high performance levels can be obtained even when operating in a system with very limited bandwidth. The performance of the scheme improves with more training in terms of detection rates as well as with realized false alarm rates approaching designed false alarms rates. Therefore, next generation wireless systems that will be equipped with reconfigurable antennas can benefit from this scheme by employing the antennas to add an additional layer of security at the physical layer.

Figure 12:
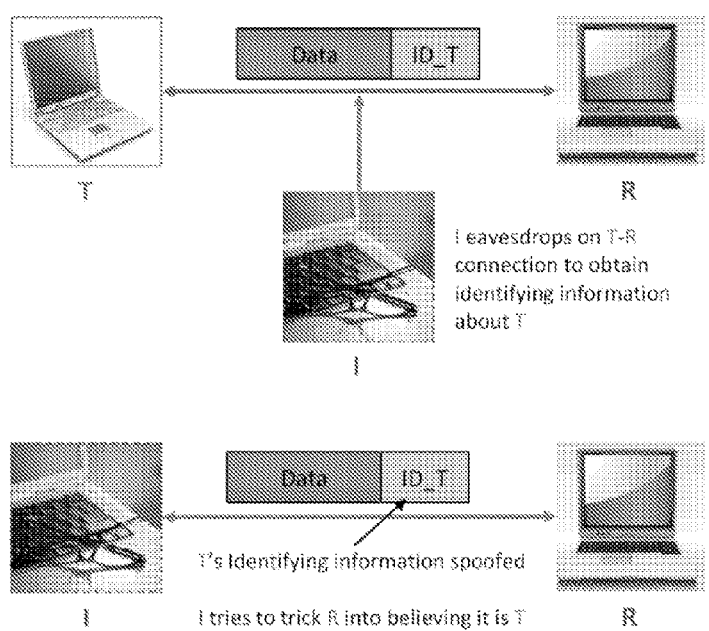
FIG. 12 illustrates the intruder problem addressed by the invention whereby in (a) I eavesdrops on a data transfer session between R and T to obtain sensitive information about T's identity and uses the information in (b) to masquerade as T to R.

Intrusion Detection Scheme for Wireless Networks
Problem Definition and Threat Model The problem that is addressed by the second exemplary embodiment of the invention is one of detecting an intruder who has gained access into the system by means of hijacking a connection already established by a legitimate user. The problem scenario again consists of three players: the receiver R, transmitter T and intruder I. Transmitter T and receiver R have established a connection and are in the process of exchanging information as shown at the top of FIG. 12. Intruder I eavesdrops into this connection and waits until he gathers sufficient information to spoof T. A surprisingly large number of vulnerabilities exist in modern wireless access technologies that allows I to obtain this information with relative ease. Once this information is obtained, I launches a spoofing attack by posing as T to R as shown at the bottom of FIG. 12.

To gain a practical perspective of the problem, R can be thought of as a wireless access point through which T is connected to the organizational network. I can be an adversarial entity whose objective is to gain entry into the organizational network, hijack T's connection with R or launch a man-in-the-middle attack on the connection between T and R, among other possibilities. The objective of the security scheme is to detect this change in the real transmitter at R in order to initiate counter measures.

To achieve his goal, I can be equipped with a powerful transceiver capable of passively monitoring and capturing all traffic between T and R and sufficient computational resources to analyze the traffic to exploit the vulnerabilities in relatively quick time. I can be an external adversary attempting to launch an attack on the network from outside the organization's premises or an internal entity who is interested in launching an attack on T. In both cases, it is noted that I cannot be physically co-located with T, which forms the basis of the method for intrusion detection in accordance with an exemplary embodiment of the invention.

It should be noted that I's motive is to compromise T's identity in the network and therefore it is imperative for I that T first initiates and establishes a connection with R. Therefore, it is assumed that I will not resort to jamming attacks to prevent T from establishing a successful connection with R.

Additionally, it is assumed that only R is equipped with a reconfigurable antenna with M modes since it is more likely that an access point is equipped with such an antenna than a user terminal due to cost and space constraints. Therefore, it is also assumed that T and R are equipped with standard omni-directional antennas.

As stated earlier, the proposed solution exploits the fact that T and I have to be located in two different physical locations which would be manifested by two different channel distributions sensed by R. Due to the multipath structure of the environment, I cannot methodically manipulate the channel between itself and R in such a way as to imitate the channel between T and R. This is because it does not and cannot know the channel between T and R. Introducing reconfigurable antennas to the solution adds multiple channel distributions corresponding to each mode used in the antenna. This makes the problem of closely matching the channel corresponding to T even more challenging for I which results in enhanced protection. However, it should be noted that the scheme of the invention does not attempt to localize T or I. Instead channel information pertaining to the different antenna modes is used to detect I if it compromises the existing link between T and R.

Description of Intrusion Detection Scheme

With the notable exception of mobile networks, many current and emerging wireless data networks are associated with stationary terminals at both ends of the link. Temporal variations in channels related to such networks arise mainly due to movements of people and objects in the vicinity of the terminals as well as small localized movement of the terminals within a very small area. See, e.g., J. Medbo, J.-E. Berg, and F. Harrysson, "Temporal radio channel variations with stationary terminal," *Vehicular Technology Conference, 2004. VTC2004-Fall.* 2004 IEEE 60*th*, pages 91-95, Vol. 1, 2004; C. Oestges, D. Vanhoenacker-Janvier, and B. Clerckx, "Channel Characterization of Indoor Wireless Personal Area Networks," *Antennas and Propagation, IEEE Transactions on*, 54(11):3143 -3150, 2006; and P. Pagani, and P. Pajusco, "Characterization and Modeling of Temporal Variations on an Ultrawideband Radio Link," *Antennas and Propagation, IEEE Transactions on*, 54(11):3198 -3206, 2006. A typical example for such a scenario would be a user seated at a bench in a public place accessing the network from a laptop connected to an access point in the vicinity. The second embodiment of the invention addresses intrusion problems that pertain to such wireless network usage scenarios and does not address large scale terminal mobility.

The amplitude of the estimated complex channel coefficient corresponding to a single frequency carrier g, is denoted by h. The probability distribution of h follows a Ricean or Rayleigh distribution. The latter distribution with parameter σ is chosen to describe h for reasons that will be discussed below:

$$p_\sigma(h) = \frac{h}{\sigma^2} e^{-h^2/2\sigma^2} \quad (24)$$

During the connection establishment process, $\sigma=\sigma_0$ corresponding to T is estimated through a sequence of training packets. At some time instant when I succeeds in spoofing T, it will hijack this connection. However, since I is at a physically different location, $\sigma=\sigma_1$ corresponding to this link will be different from $\sigma_0$ and will be unknown.

Let $h_i$ (i∈Z, i>0) be a sequence of observed i.i.d. channel estimates from the incoming packets after the initial training stage and $h=[h_j, \ldots, h_k]$. i can be taken to denote the packet or time index. N=k−j+1 is the block size. If σ(h) is denoted as the σ value of the Rayleigh distribution from which the elements of h originated, the intrusion detection problem can be now formulated as a hypothesis testing problem as follows:

$$H_0: \sigma(h) = \sigma_0 \quad (25)$$

$$H_1: \sigma(h) \neq \sigma_0 \quad (26)$$

The invention employs a Neyman-Pearson detector which decides $H_1$ if the likelihood ratio exceeds a threshold:

$$L(h) = \log\left(\frac{p_{\sigma_1}(h; H_1)}{p_{\sigma_0}(h; H_0)}\right) > \gamma \quad (27)$$

However $\sigma_1$ is not known in this case. In this case, it is well known that the GLR test which replaces $\sigma_1$ with its MLE estimate is asymptotically the uniformly most powerful among all tests. Hence, the GLR test that uses the MLE of $\sigma_1$ denoted by $\hat{\sigma}_1$. Estimation is done over the elements in block h. The MLE for $\sigma_1^2$ is given by:

$$\hat{\sigma}_1^2 = \frac{1}{2N} \sum_{i=j}^{k} h_i^2 \quad (28)$$

Substituting (28) in (27) and simplifying yields:

$$L(h) = \left(\frac{2N\sigma_0^2}{\lambda}\right)^N e^{\left(\frac{\lambda}{2\sigma_0^2} - N\right)} \quad (29)$$

where $\lambda = \sum_{i=j}^{k} h_i^2$.

The use of multiple antenna modes will result in M different channel realizations at each time instant. The environment 'seen' by the different modes of the antennas will be different due to the differences in their radiation patterns and therefore the distribution for each of these M channel realizations will be characterized by different σ's. Assuming that the channel realizations yielded by the different antenna modes are independent, then:

$$L(h) = \log\left(\prod_{m=1}^{M} \frac{p_{\sigma_{1m}}(h_m; H_1)}{p_{\sigma_{0m}}(h_m; H_0)}\right) > \gamma \qquad (30)$$

where $\sigma_{0m}$ and $\sigma_{1m}$ are the distributions' parameters for mode m under the null and alternate hypothesis respectively. $h_m$ represents the channel vector for mode m. The decision function simplifies to:

$$L(h) = \sum_{m=1}^{M}\left[\left(\frac{2N\sigma_{0m}^2}{\lambda_m}\right)^N e^{\left(\frac{\lambda}{2\sigma_{0m}^2}-N\right)}\right] \qquad (31)$$

where $\sigma_m = \sum_{i=j}^{k} h_{im}^2$ and $h_{im}$ denotes the channel realization at time instant i for the $m^{th}$ antenna mode. The control parameters that can be used to tune the performance of this scheme are listed in Table II.

TABLE II

Control Parameters

| Parameter | Description |
|---|---|
| N | Block size. Number of most recent consecutive channel estimates used in the test including the estimate corresponding to the packet under test. |
| $N_T$ | Number of training packets used to estimate $\sigma_0$ during connection initialization |
| γ | Threshold. Can be set based on the values of L(h) observed during the training phase. |
| $N_D$ | Detection delay. Maximum number of packets from I within which it should be detected. If detection doesn't happen by this time, it is considered a missed detection. |
| $N_F$ | Number of packets from T before I takes over. Though this is not a controllable parameter in real time, it has a critical effect on the false alarm rate. |
| M | Number of antenna modes. |

Figure 13:
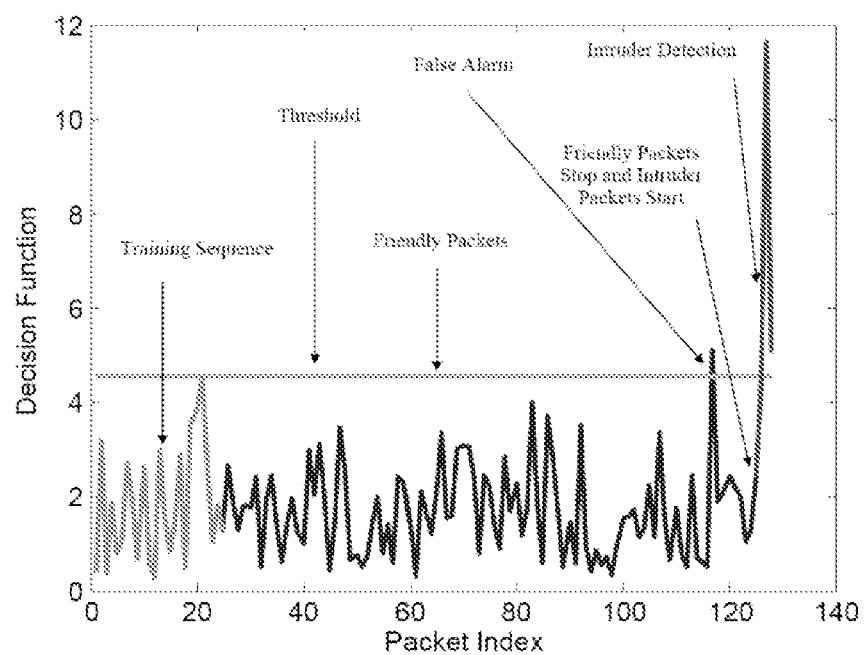
FIG. 13 illustrates a sample evolution of the GLR test where NT=25, NF=100, N=5, and M=1 for a threshold chosen to be the maximum of L(h) observed during training

A graphical depiction of these parameters is shown with respect to a sample evolution of L(h) in FIG. 13.

Detection Scheme

Steps of the detection scheme in an exemplary embodiment include:

1. During the outset of the session, R estimates $\sigma_0$ through a training sequence. The number of packets used for training is denoted by $N_T$.
2. R also computes L(h) for j=i−N +1 and k=i based on these channel estimates at each instant i (N≤i≤$N_T$).
3. Actual transmissions begin from T and R continues to compute L(h) for each packet transmission. I is assumed to hijack this connection and starts transmitting to R after $N_F$ transmissions from T.
4. Based on these computed L(h) during the training phase, a threshold γ is picked such that an alarm is raised whenever L(h)>γ.
5. In the event of an alarm, a higher layer re-authentication procedure can be evoked to reverify the identity of the transmitter.

Threshold Selection:

The value of γ will be chosen based on the values observed for L(h) during the training period. If the maximum value of L(h) observed during training is $L_M(h)$, γ can be expressed as $KL_M(h)$ where K is the scaling factor that needs to be controlled in order to achieve the desired detection and false alarm rates. In accordance with this embodiment of the invention, selection of K is performed in an adaptive manner. One starts with K=1 and gradually increases it's value until an acceptable false alarm rate is achieved.

The connection can be vulnerable to an attack during this threshold selection phase as well. Therefore, higher layer authentication protocols (e.g. 802.11i) should be evoked to verify false alarms during this adaptation process to ensure security until the target value of K is reached though this may cause some processing overhead due to frequent re-authentication. Optionally, depending on the level of threat to which the network is exposed to, this re-authentication process can be relaxed during this adaptive threshold determination phase for more efficient operation and all alarms may be treated as false alarms.

Channel Measurements

Figure 14:
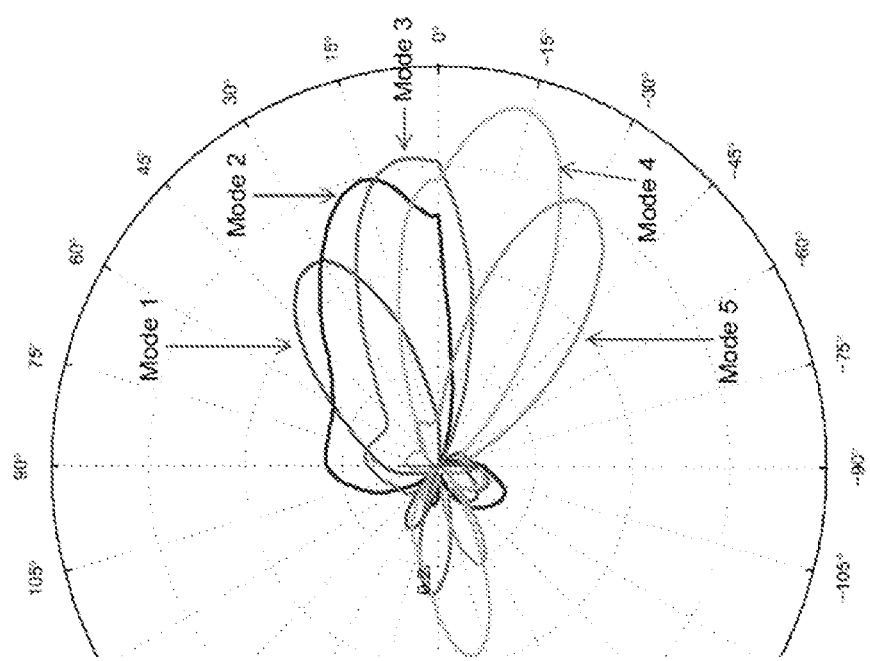
FIG. 14 illustrates radiation patterns corresponding to the 5 different antenna modes in the elevation plane corresponding to the measurement environment plane shown in FIG. 3. All patterns are vertically polarized.

Channel measurements were performed on Drexel University campus using a four port vector network analyzer. The measurement environment and node locations are the same as described above with respect to FIG. 3. As in the first embodiment, the measurements were performed with R equipped with a reconfigurable leaky wave antenna of the type disclosed by D. Piazza, M. D'Amico, and K. R. Dandekar, "Performance Improvement of a Wideband MIMO System by Using Two-Port RLWA," *Antennas and Wireless Propagation Letters, IEEE,* 8:830-834, 2009. The radiation patterns corresponding to the five modes used in the study are shown in FIG. 14. T and I were equipped with standard monopoles. Measurements were performed at 2.484 GHz which corresponds to the center frequency of channel 14 of the 802.11 band. Two R, four T and ten I locations were chosen which yielded a total of eight R-T links each with then corresponding R-I links. For each (R, T, I) combination, 1000 time snapshots were recorded for the R-T and R-I links for the 5 different antenna modes. Measurements were performed during different hours of the day over several days during which there was low to moderate movement in the environment.

Why Rayleigh Distribution?

It has been assumed that the channel amplitudes follow a Rayleigh distribution instead of the more general Ricean distribution. In order to justify this assumption, the empirical distribution functions obtained for each link from the measured data was compared to a Rayleigh or Ricean distribution whose parameters were estimated from the measurements. The similarity between the empirical distribution ($p_e$) and standard distribution ($p_p$) for each link is quantified through two metrics: the total variation distance between the distributions and the Kullback-Leibler (KL) divergence.

The total support S is defined as:

$$\min(S_e, S_p) \le S \le \max(S_e, S_p) \qquad (32)$$

where $S_e$ and $S_p$ are the supports of the empirical and standard distributions respectively. S is discretized into T evenly spaced discrete points. The total variation distance between the two distributions is defined as:

$$e = \frac{1}{2}\sum_{t=1}^{T} |p_e(h_t) - p_p(h_t)| \qquad (33)$$

where $p_e(h_t)$ and $p_p(h_t)$ denote the values of the distributions evaluated at the $t^{th}$ discrete point in S. The KL divergence between $p_e$ and $p_p$ is defined as:

$$D_{KL}(p_e P p_p) = \sum_{t=1}^{T} p_e(h_t) \log_2 \frac{p_e(h_t)}{p_p(h_t)} \quad (34)$$

Table III lists the trends in the observed values over all the measured links for the difference between the empirical distribution and the two standard distributions.

TABLE III

Difference between Empirical and Parametric Distributions

| Distribution | Mean of e | Standard Deviation of e | Mean KL Divergence |
|---|---|---|---|
| Rayleigh | 0.059 | 0.014 | 1.56 |
| Ricean | 0.036 | 0.014 | 0.32 |

As can be observed, though the channel distributions are not 'purely' Rayleigh or Ricean, which is to be expected, they resemble these distributions sufficiently enough to provide the inventors with the ability to develop an analytical framework for the problem. Moreover, as the values indicate, on average, due to the combination of line-of-sight (LOS) and non-line-of-sight (NLOS) of links, modeling the channel as Rayleigh does not lead to a large error compared to modeling it as Ricean in the system, though the observed distributions marginally resemble the Ricean distribution more than the Rayleigh. Nevertheless, Rayleigh distribution was picked over Ricean for three reasons. Closed form MLE estimates do not exist for the parameters that characterize Ricean distributions and it requires recursive methods that are computationally intense. See, e.g., J. Sijbers, A. J. den Dekker, P. Scheunders, and D. Van Dyck, "Maximum-likelihood estimation of Rician distribution parameters," *Medical Imaging, IEEE Transactions on,* 17(3):357 -361, 1998. The second reason is that when small values of N are used in the scheme, the recursive scheme does not achieve convergence resulting in very poor estimates that will have a significantly negative effect on the scheme's performance. Finally, a simpler form of GLRT function cannot be formulated due to the Bessel functions that characterize Ricean distributions which will lead to higher computational complexity. Based on these observations and reasons, the channel was modeled as Rayleigh distributed.

Analysis and Results

The performance of the intrusion detection scheme was studied in terms of the probability of missed detection ($\beta$) and false alarm rates ($\alpha$) as a function of the different control parameters listed above. $\alpha$ and $\beta$ characteristics presented in this section were computed from the measured channels as follows:

1. For each (R, T, I) combination, a detection threshold $\gamma$ was obtained through the first $N_T$ training samples.
2. For the $N_F$ subsequent samples from T, the number of instances where L(h) exceeds $\gamma$ was recorded. A false alarm was recorded when the number of instances was greater than one.
3. The friendly samples were followed by samples from I. A detection was recorded if L(h) exceeds $\gamma$ within the first $N_I$ transmissions from I. If not, a miss was recorded.
4. This process was repeated for 100 trials with different subsets of friendly and adversary samples and the average $\alpha$ and $\beta$ were computed.
5. The overall $\alpha$ and $\beta$ were computed as the average obtained over all possible (R, T, I) combinations.

Unless specifically stated otherwise, the presented results also reflect the average over the different antenna combinations possible for a given M, i.e., for a given $\alpha$, the presented missed detection probabilities are averages obtained over the $\binom{5}{M}$ possible combinations for a given M.

Single Antenna Mode (M=1)

Figure 15:
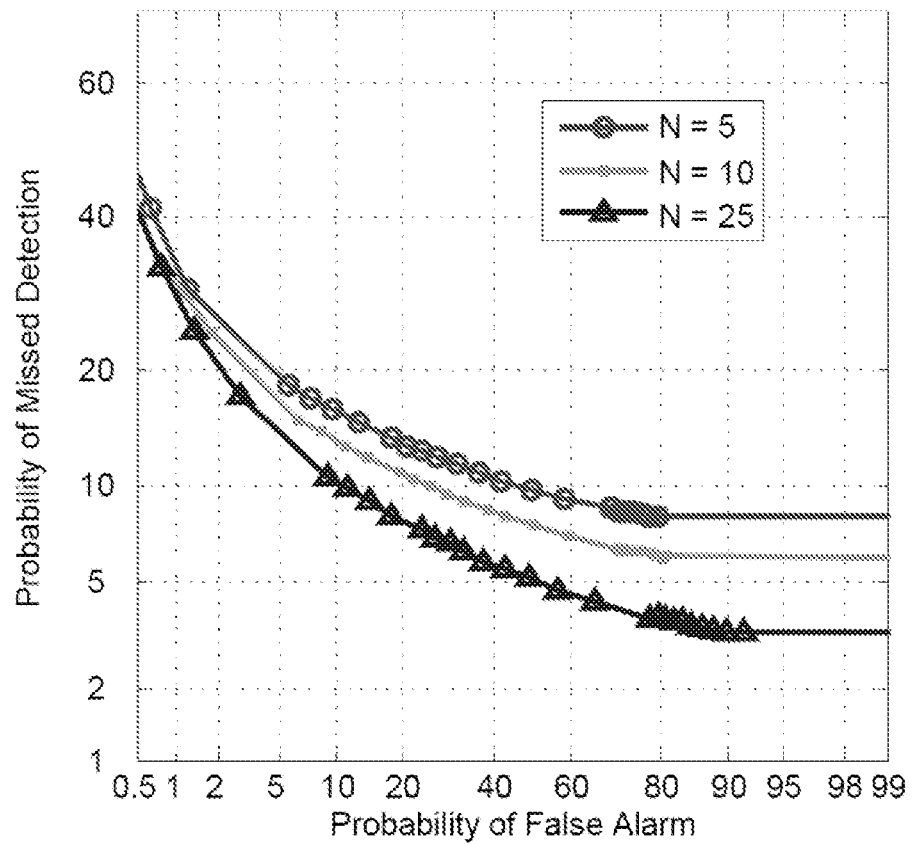
FIG. 15 illustrates average DET curves for a single antenna (M=1) mode for different values of N, where ND is equal to N for each curve and NT=25. For a given $\alpha$, $\beta$ decreases with the block size; however, at low $\alpha$ levels, the corresponding $\beta$ levels remain unacceptably high for a single antenna mode even at relatively large block sizes.

FIG. 15 shows the average detection error tradeoff (DET) curves for a single antenna mode for different values of block size N. The nonlinear scaling of the axes in a DET curve is designed to yield a straight line when L(h) from the system follows a normal distribution. The diagonal line defined by $\beta=-\alpha$ represents completely random performance and curves that lie on the quadrant left of this line represent positive levels of performance.

It can be observed that the performance improves with block size. This is due to two reasons. A larger block size gives a better estimate for o and hence when the the intruder starts injecting packets, the difference between $\sigma_0$ and $\sigma_1$ becomes more clear which in turn results in L(h) growing above the threshold rapidly. Moreover when N is large, the increased contribution from channels corresponding to I in L(h) after the intrusion will result in a rapid increase in its value as well.

Moreover, the values of N used in the computation of L(h) are not sufficiently large enough to yield a Gaussian behavior and therefore the DET curves do not exhibit a linear trend. While such a Gaussian behavior is preferred since it allows us to resort to standard normal distributions to set the threshold $\gamma$, it will not be possible to employ a sufficiently large N to yield this behavior since a meaningful minimum detection delay $N_D$ is determined by the block size.

However, with just a single antenna mode, the achievable detection rates are unacceptably low at low $\alpha$ regions. In cases where $\sigma_1$ and $\sigma_0$ are not well separated, the level of increase in L(h) after intrusion will not be sufficient enough to match the $\gamma$ that is required to maintain a low $\alpha$, which in turn leads to poor detection rates. To gain insights into this, the maximum percentage difference between $\sigma$'s among the different antenna modes is defined as:

$$P = \max_{m=1,\ldots,M} \frac{|\sigma_{1m} - \sigma_{0m}|}{\sigma_{0m}} \times 100\% \quad (35)$$

Figure 16:
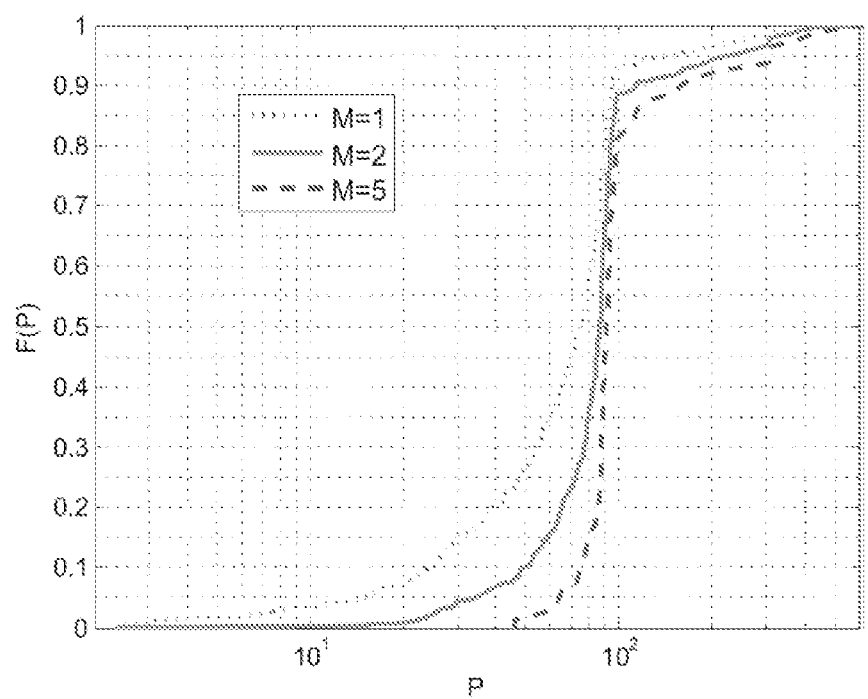
FIG. 16 illustrates CDF of P for different values of M showing that the support and mean shift toward higher values with increasing M.

FIG. 16 shows the CDF of P for different values of M. Table IV lists some of the quantities extracted from these CDFs. When a single antenna mode is employed, the mean maximum percentage difference is 75.5% and the probability of this percentage difference being greater than 100% is as low as 0.07. This observation clearly elucidates the challenge with designing a GLRT based detection scheme using a single antenna. Though the links can be differentiated in terms of $\sigma$, the amount of separation in $\sigma_0$ and $\sigma_1$ may not be sufficient in any given scenario for the GLRT to yield acceptable performance levels with a single antenna mode.

TABLE IV

Statistics Pertaining to P from Measured Links

|  | M = 1 | M = 2 | M = 3 | M = 4 | M = 5 |
|---|---|---|---|---|---|
| Mean (P) | 75.5 | 95.8 | 105.6 | 111.7 | 116.1 |
| Median | 76.2 | 86.6 | 88.9 | 90.4 | 91.5 |
| Pr(P ≤ 100) | 0.93 | 0.89 | 0.86 | 0.84 | 0.82 |

Figure 17:
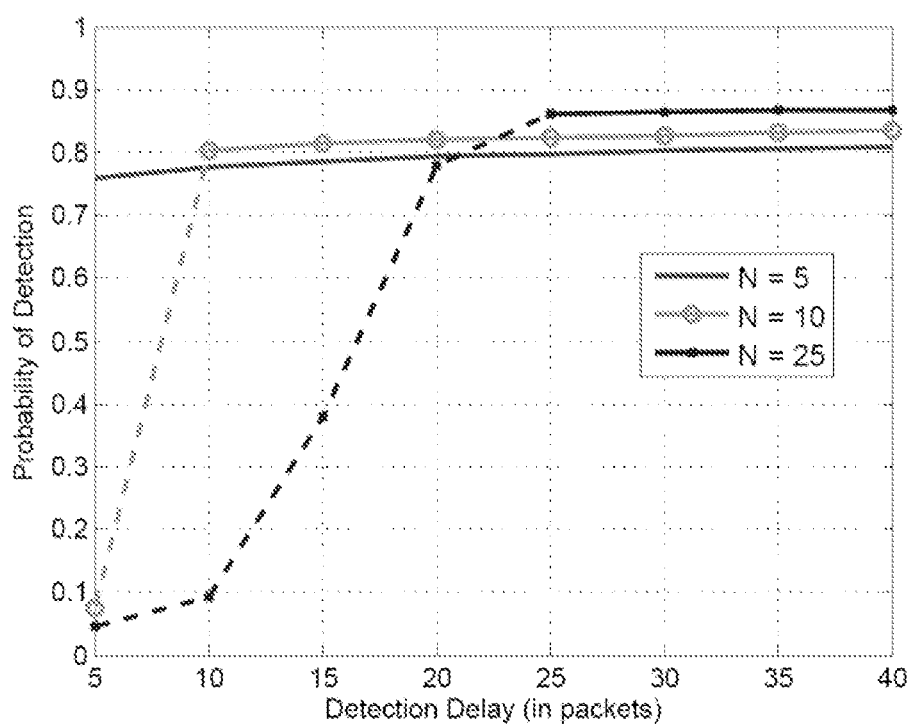
FIG. 17 illustrates the variation of detection probability with ND for a single antenna (M=1) mode at $\alpha$=0.05 where NT=25 and ND is equal to N for each curve. The dashed segments correspond to points where $N_D<N$. Longer delays result in only marginal improvements in detection. Larger N improves performance, but the minimum required detection delay is longer for larger N's.

FIG. 17 shows the variation of probability of detection as a function of detection delay in terms of number of packets. Understandably, detection rate improves with the allowable detection delay. However, it should be noted that timely detection of the intruder is very critical and therefore $N_D$ cannot be increased to arbitrarily large values to achieve the required detection rates. Again, it can also be observed that the performance improves with block size. However, to be effective, higher values of N require that the detection delay to be at least as long as the block size so that the block will contain samples entirely from the intruder. The effect of N being less than the detection delay can be observed by the dotted lines in FIG. 17 where the detection performance is significantly deteriorated.

Figure 18:
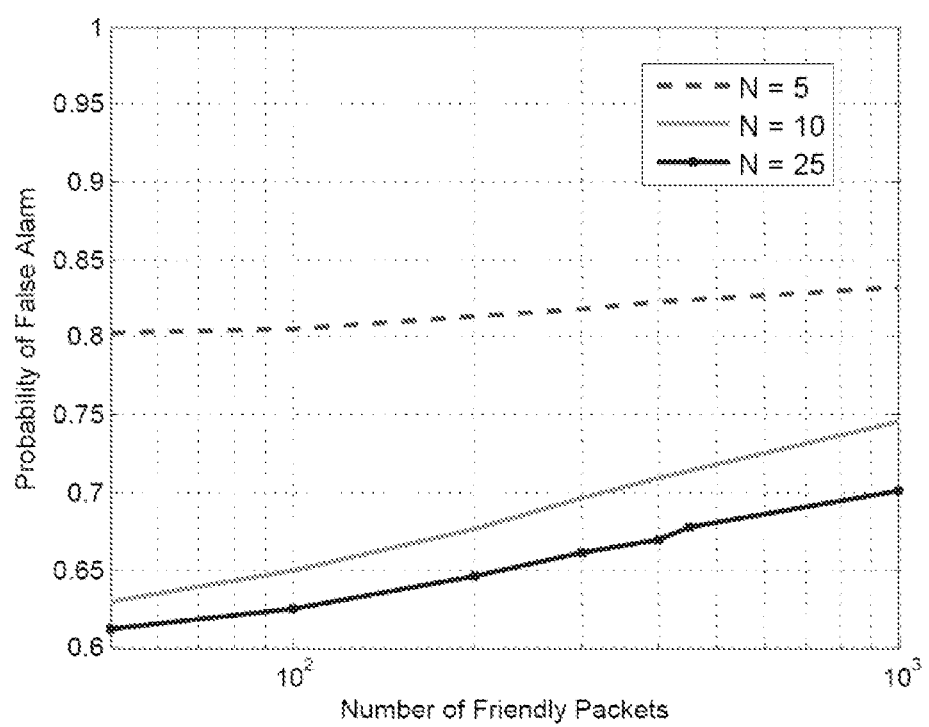
FIG. 18 illustrates a variation of $\alpha$ with NF for a single antenna (M=1) mode at $\beta$=0.05, where NT=25 and $N_D$ is equal to N for each curve. Longer numbers of transmissions from T increases the probability of false alarms. Larger N improves performance due to better $\sigma_0$ estimates.

The false alarm rate, as a function of the number of friendly transmissions from T before I takes over is shown in FIG. 18. As one would expect, the chances of raising a false alarm rises with more friendly packets. A larger N results in a better estimate for $\sigma_0$ during the training phase. Additionally, it will yield a value for $\sigma(h)$ that is closer to the true $\sigma_0$ as well. Thus, the probability of $L(h)$ to exceed $\gamma$ picked based on the the estimated $\sigma_0$ will be lower and hence $\alpha$ improves with N.

To summarize the preceding trends, higher N lowers $\alpha$ while improving detection rates. Though a longer detection delay can help detection rates, in practice it is undesirable to have such long delays. However, due to the marginal difference between the $\sigma$ values for the T-R and T-I links, it is challenging to obtain acceptable detection rates while keeping the false alarm rates very low when using a single mode antenna system. Hence, multi-mode antenna systems are used.

Multiple Antenna Modes

Figure 19:
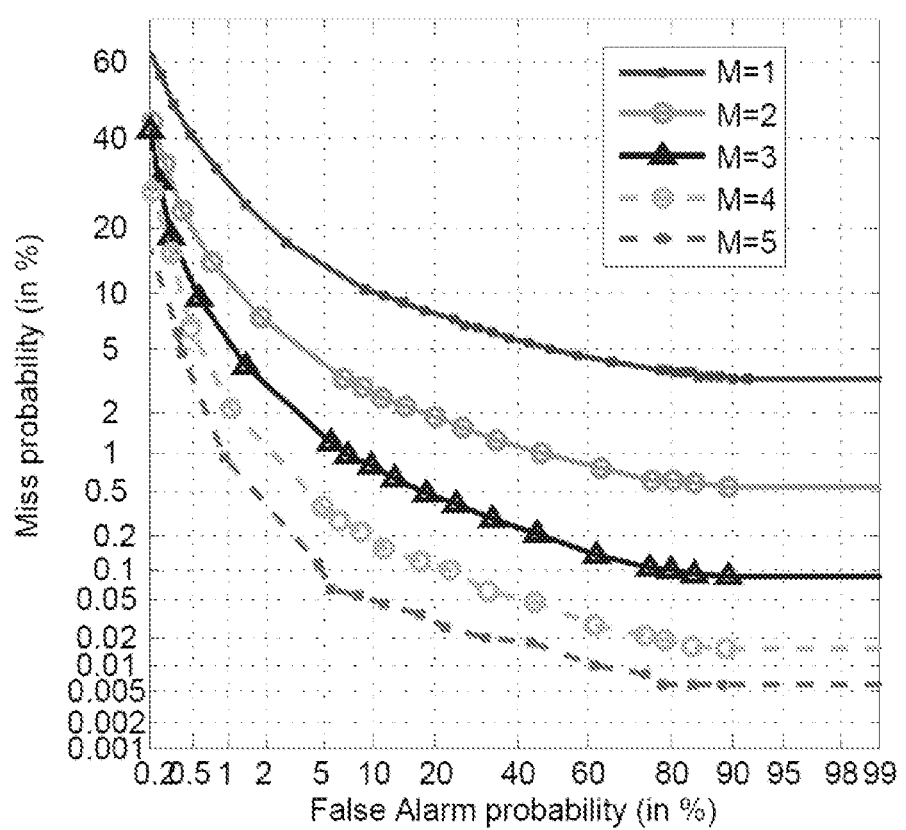
FIG. 19 illustrates average DET curves for multiple antenna modes for $N=N_D$=10 and NT=25. For a given $\alpha$, $\beta$ decreases with an increasing number of antenna modes. Acceptable levels of $\beta$ can be achieved at low $\alpha$ levels by using multiple antenna modes.

The multiple antenna mode case begins at FIG. 19, which shows the DET curves achievable through the combination of channel information corresponding to multiple antenna modes. For each incoming packet, $L(h)$ is computed as in (31) based on the channel information corresponding to the chosen M configurations from which subsequent detection rates and false alarm rates are computed. It can be clearly seen that the detection rate significantly improves with the number of modes for a given $\alpha$. Referring again to FIG. 16 and Table IV, it can be observed that the maximum percentage difference between $\sigma$'s among the different antenna modes increases with M. This is by virtue of the fact that different antenna modes will exhibit different $\sigma$ values and hence the probability that the difference between $\sigma_0$ and $\sigma_1$ is very small for all the modes will be lower. Thus, modes that exhibit a larger difference in $\sigma$ will contribute more to the GLR test resulting in better performance. Increasing M increases the probability of finding modes that exhibit a larger difference in $\sigma$'s and hence performance significantly improves with M. Again due to the lower value of N, a non-Gaussian trend is observed in the observed DET curves.

Figure 20:
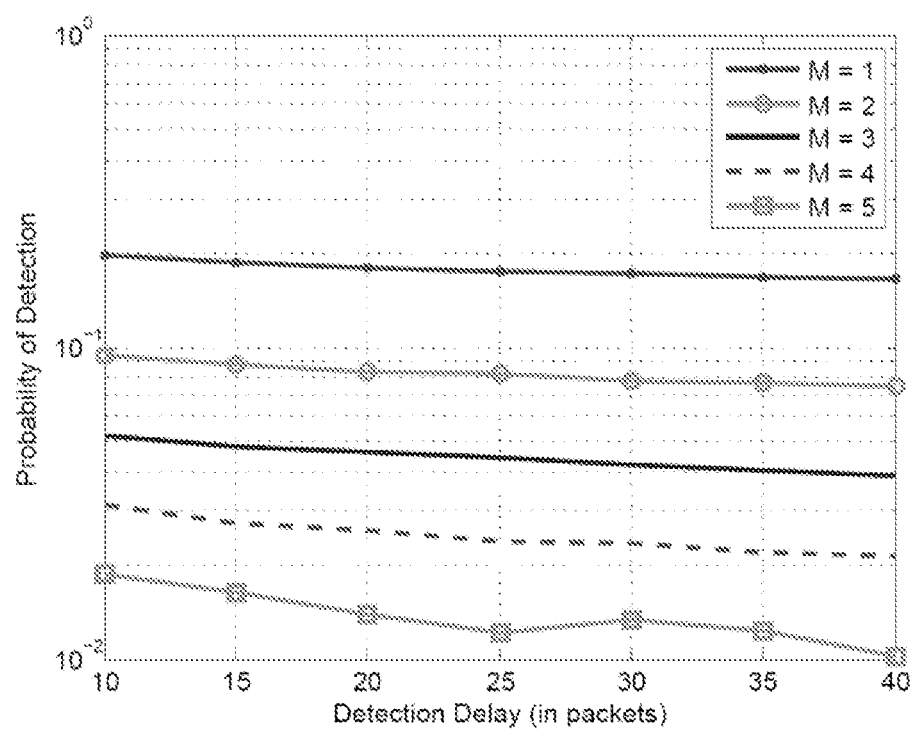
FIG. 20 illustrates the variation of detection probability with $N_D$ for multiple antenna modes at $\alpha$=0.05, $N=N_D$=10, and $N_T$=25. As in FIG. 17, longer delays result in only marginal improvements in detection rates without requiring longer detection delays.

FIG. 20 shows the achievable detection rates as function of detection delay for the different M values. Comparing this with FIG. 17, it can be seen that the level of improvement achievable in detection rates is quite high with M as opposed to N. For example, by increasing N from 10 to 25 results in a mere 5% improvement in detection when a single mode is used. Moreover, this improvement comes at the cost of a longer detection delay. By introducing an additional mode, $\beta$ can be lowered from around 20% to 9% while keeping N and $N_D$ at 10.

Figure 21:
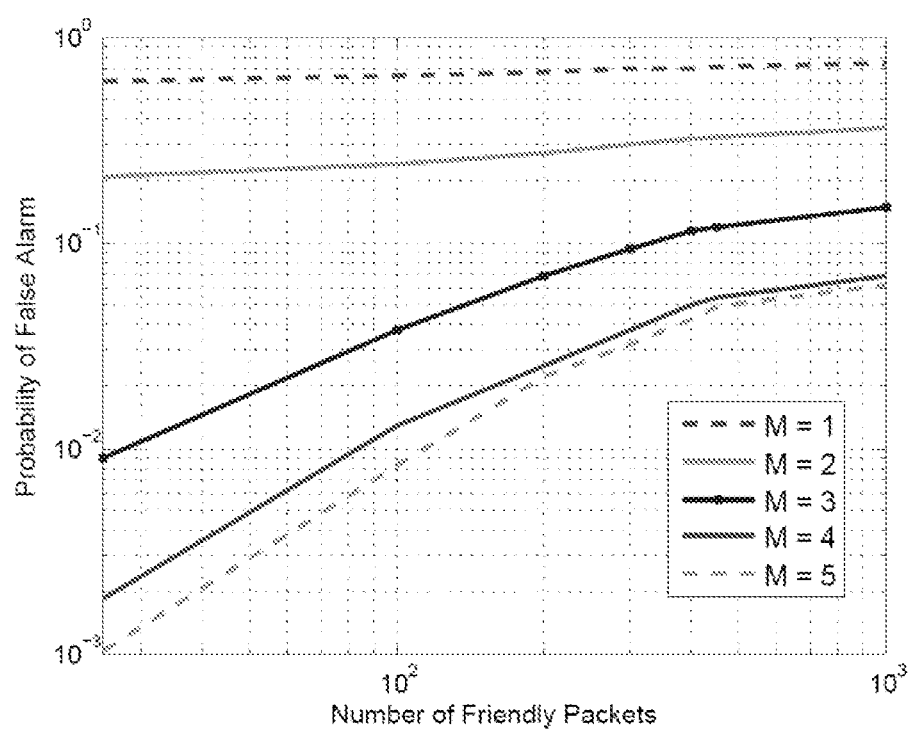
FIG. 21 illustrates variation of a with NF for multiple antenna modes at $\beta$=0.05 and $N_T$=25, where $N_D$=N for each curve and $\alpha$ decreases with M.
Figure 22:
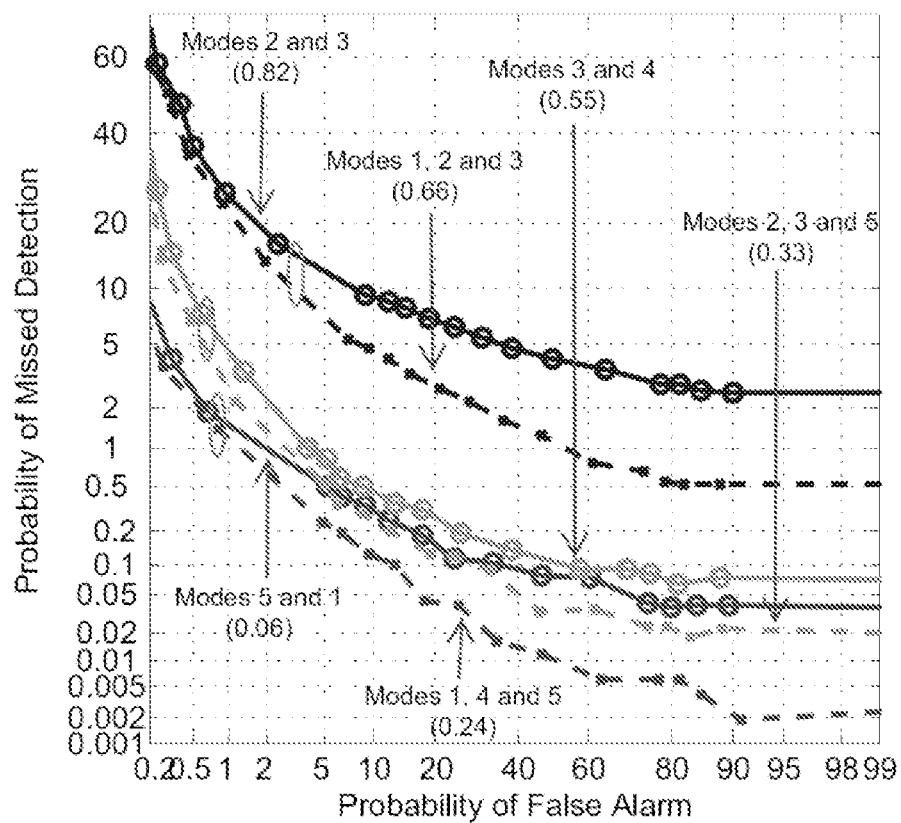
FIG. 22 illustrates the average DET curves for different antenna mode combinations wherein $N=N_D$=10 and $N_T$=25. Detection rates have a direct correlation with the correlation coefficient between the patterns of the employed antenna modes. For a given M, lower correlation coefficients between the antenna patterns result in better detection for a given $\alpha$.

FIG. 21 shows $\alpha$ as a function of the number of friendly packets. As described in step (2) above, $\alpha$ is defined as the probability that there will be at least one packet that exceeds the threshold $\gamma$ during the friendly transmissions. Improvements in $\alpha$ is also observed with increasing M. Naturally false alarms increase with increasing friendly packets regardless of M. For relatively smaller values of N and a single antenna mode, when certain samples in h come from the tail region of the underlying Rayleigh distribution, the resulting estimate of $\hat{\sigma}_1$ can significantly diverge from $\sigma_0$ resulting in excursions of $L(h)$ above the threshold $\gamma$. However, when multiple antenna modes are employed, the probability that the channels corresponding to most of the modes belong to the tail region at any given instant is reduced. Therefore at every time instant, the "well-behaved" modes help dampen the hikes in $\hat{\sigma}_1$ due to the "stray" modes and therefore help keep the excursions of $\hat{\sigma}_1$ above $\gamma$ low and hence reduce the probability of false alarm.

Which Modes to Choose?

From the above results is is clear that introducing multiple antenna modes improves the system's overall performance. However, these results do not provide insights on how to pick the mode combinations and most importantly if there is any benefit in increasing the number of modes beyond a certain level. Some insights to this problem can be found by analyzing FIG. 22 and Table V. Table V lists the spatial pattern correlation that exists between the radiation patterns corresponding to the different antenna modes used in the study. The best, worst and average detection rates achieved by different individual mode combinations for M=2 and M=3 are shown in the figure. For M=2, it is evident that the detection rate is a function of the antenna correlation coefficient. The best performance is achieved by the mode combination (5,1) which also has the lowest correlation between patterns. The combination with the highest correlation of 0.82 achieves the worst performance. Similarly for M=3, detection rates exhibit the same trend with respect to the average correlation between the different pair of modes within the combinations. Moreover, it can be seen that the performance achieved by the best combination for M=3 outperforms the M=5 case as well.

The above-described behavior can be attributed to the well known phenomenon of decorrelated antenna patterns resulting in decorrelated channel realizations. The information provided by more decorrelated channel realizations serves to improve the 'quality' of $L(h)$ and hence enables the scheme to distinguish between T and I more accurately.

Based on these trends, two guidelines are suggested for picking the different antenna modes for minimizing intrusion. Antenna modes should be picked such that the pattern correlation coefficient between the different modes should be kept as low as possible. Many reconfigurable antenna architectures exist that can generate patterns with a very low correlation coefficient between their modes. See e.g., J. Kountouriotis, D. Piazza, K. R. Dandekar, M. D'Amico, and C. Guardiani, "Performance analysis of a reconfigurable antenna system for MIMO communications," *Antennas and Propagation (EUCAP), Proceedings of the 5th European Conference on*, pages 543-547, 2011; and D. Piazza, P. Mookiah, M. D'Amico, and K. R. Dandekar, "Experimental Analysis of Pattern and Polarization Reconfigurable Circular Patch Antennas for MIMO Systems,". *Vehicular Technology, IEEE Transactions on*, 59(5):2352-2362, 2010. The second is that, adding new modes will improve detection rates as long as the newly introduced mode does not diminish the average correlation coefficient among the modes. This can be seen by observing the different circled pairs of DET curves in FIG. 22, where adding a new mode improves detection when the addition of the mode lowers the average correlation coefficient among the modes.

TABLE V

Pattern correlation coefficients between different modes of the LWA

|        | Mode 1 | Mode 2 | Mode 3 | Mode 4 | Mode 5 |
|--------|--------|--------|--------|--------|--------|
| Mode 1 | 1      | 0.73   | 0.42   | 0.10   | 0.06   |
| Mode 2 | 0.73   | 1      | 0.82   | 0.27   | 0.07   |
| Mode 3 | 0.42   | 0.82   | 1      | 0.55   | 0.11   |
| Mode 4 | 0.10   | 0.27   | 0.55   | 1      | 0.56   |
| Mode 5 | 0.06   | 0.07   | 0.11   | 0.56   | 1      |

Effect of Training

Figure 23:
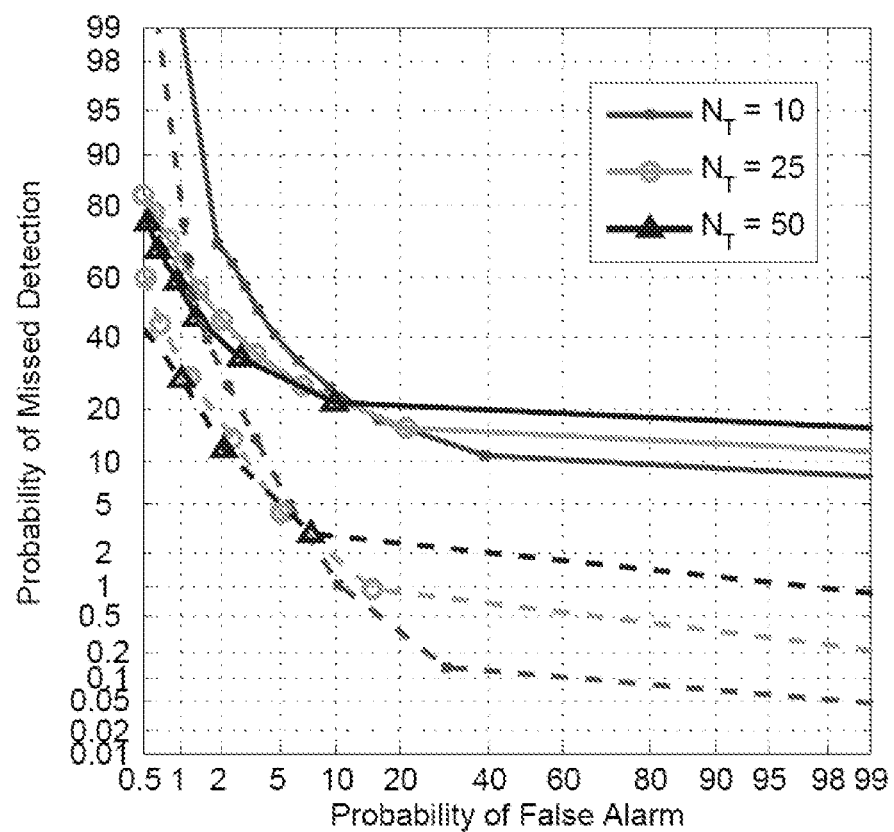
FIG. 23 illustrates the average DET curves for M=1 and M=5 for a different number of training samples where $N=N_D$=10. Solid lines indicate M=1 and dotted lines indicate M=5. Longer training results in better detection at lower $\alpha$ regions; however, the gains achieved from more training cannot match the gains achieved by employing more number of antenna modes.

The quality of training will have a significant effect on the performance of the scheme as the estimated $\sigma_0$ forms the basis for the likelihood ratio based on which it operates. FIG. 23 shows the effect of the amount of training on the DET curves. As evidenced by the figure, longer training leads to better performance at the lower $\alpha$ regions as expected. But interestingly, more training has a negative effect on system performance at the larger $\alpha$ regions. Recall that the threshold $\gamma$ is computed as $KL_M(h)$ where $L_M(h)$ is the maximum of $L(h)$ observed during training Longer training on average leads to marginally larger values for $L_M(h)$. At high $\alpha$ regions, $K \approx 1$ and hence the threshold $\gamma$ is more sensitive to $L_M(h)$. Therefore, for a given $\alpha$, keeping all other parameters constant while increasing only $N_T$ results in an increased estimate of the threshold $\gamma$, which in turn deteriorates detection. Although the estimate of $\sigma_0$ does improve with $N_T$, the increase in $L_M(h)$ overweights its benefit in the high $\alpha$ region leading to performance degradation. Nevertheless, meaningful utilization of this scheme will involve operating in the low false alarm region and therefore longer training still will be preferred.

Practical Considerations

Some key practical issues need to be considered in order to make this scheme work in practice. The most critical issue is the problem of obtaining channel estimates over all the antenna modes on a packet-by-packet basis. FIG. 11 referenced above shows a possible candidate for a frame structure at the physical layer that can be used to achieve this operation. As illustrated, an extended payload is interspersed with the necessary training symbols for each mode along with padded intervals to allow for switching the antenna to a new mode and resynchronization. High speed switches with switching speeds in the order of picoseconds currently exists that can allow the antenna to switch modes at a rate compatible with current high data rate applications.

As noted previously, the scheme of the second embodiment is proposed to complement existing higher level security protocols. Therefore, such protocols should continue to play their role in protecting the wireless link. An adaptive approach can be pursued when the GLR test triggers an alarm at the physical layer. When an alarm is raised by the physical layer scheme, the system can reconfigure the GLR test to operate in a point on the DET curve that prioritizes low missed detection over false alarms. Subsequent alarms should be handled by the the upper layer authentication protocols such as 802.11i until it is ensured that the perceived threat does not exist after which point the GLR test can prioritize over false alarms again. Moreover, successfully adapting the alarm threshold will also rely on these re-authentication protocols.

Channel statistics may also gradually change with time which can lead to arbitrarily high false alarm rates. Periodic retraining can be implemented to keep the system performance within acceptable levels. Therefore, this scheme can benefit from more comprehensive training algorithms that continually update $\sigma_0$ based on packets that pass the intrusion detection test at the physical as well as upper layers.

The intrusion detection scheme of the second embodiment of the invention utilizes physical layer information based on a reconfigurable antenna. The intrusion detection problem was setup as a generalized likelihood ratio test under the assumption of Rayleigh fading channels for different antenna modes. The assumption was justified based on channel measurements gathered in an indoor environment using a network analyzer. The measurements were then used to study the performance of the scheme as a function of several control parameters available to the user. It was observed that large block sizes lower false alarm rates while yielding high detection rates as well. By utilizing multiple modes in a reconfigurable antenna concurrently in the likelihood function, it was shown that the detection rates can be improved and false alarm rates can be decreased while keeping the block size low. The pattern correlation coefficient that exists between the radiation patterns of the different antenna modes was shown to have a direct correlation with the resulting detection performance, with lower pattern correlation resulting in better performance. In networks with very limited or non existent security such as public WiFi spots, the proposed scheme can add an easy to implement layer of security that can provide improved levels of protection against intrusion. In more secure networks operating in hostile environments, this scheme in conjunction with existing higher layer based security mechanisms can provide a much needed extra layer of security.

While the invention has been described with reference to specific embodiments, the description is illustrative of the invention and is not to be construed as limiting the invention. For example, those skilled in the art will appreciate that the invention is typically implemented in part as software that runs on a processor to perform the monitoring and processing functions described herein for measuring and processing the wireless channel information passing between the transmitter and receiver. The present invention thus includes not only the disclosed methods but also the programmed processor and associated computer readable storage media containing such software as elements of the system for performing the methods described herein. Such features as well as various modifications and applications may occur to those skilled in the art without departing from the spirit and scope of the invention as defined by the appended claims.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more, or different elements, which are disclosed above even when not initially claimed in such combinations. For example, a practical embodiment of the invention may include both the authentication scheme of the first embodiment and the intrusion detection scheme of the second embodiment. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus, if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense, it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

What is claimed:

1. A method of authenticating a transmitting device in a communication system using at least one multi-mode reconfigurable antenna, comprising the steps of:
    collecting wireless channel information for different antenna modes of said at least one reconfigurable antenna for a legitimate transmitter;
    combining the collected wireless channel information for different modes of said at least One reconfigurable antenna into a characteristic transmission fingerprint;
    forming a detection threshold based on the characteristic transmission fingerprint for the legitimate transmitter at the outset of a communication connection;
    comparing wireless channel information from a later transmission with said fingerprint based on a test metric to determine if the wireless channel information from the later transmission corresponds to said fingerprint within a designated threshold; and
    identifying the transmitter of said later transmission as an intruder if said wireless channel transmission does not correspond to said fingerprint within said designated threshold,
    wherein said designated threshold for a given false alarm rate is computed during a connection initialization phase of said communication connection by transmitting multiple training packets from the legitimate transmitter to a receiver and the test metric is computed between fingerprints corresponding to all of the training packets.

2. The method of claim 1, wherein the test metric comprises an angle between the fingerprint of a later transmission and said fingerprint.

3. The method of claim 2, wherein an acceptable angle range between the later transmission and the fingerprint is determined based on an acceptable false alarm rate.

4. The method of claim 1, wherein the computed test metrics are gathered to form a distribution function on the test metric to determine the designated threshold for the given false alarm rate.

5. The method of claim 1, wherein the different modes of said at least one reconfigurable antenna are at least partially decorrelated.

6. The method of claim 1, wherein the designated threshold is adaptive.

7. The method of claim 1, further comprising the step of detecting intrusion into a wireless transmission between a transmitter and a receiver of the communication system.

8. The method of claim 7, wherein the wireless channel information for different modes is collected at a physical layer of the transmitter and the intrusion detecting step comprises:
    monitoring the wireless channel information using a generalized likelihood ratio test; and
    generating an alarm when an abrupt change in the wireless channel information is detected, said abrupt change being representative of an intrusion.

9. The method of claim 8, wherein the wireless channel information is provided for multiple decorrelated modes of the reconfigurable antenna and said alarm is generated when a cumulative abrupt change over multiple modes is observed in the cumulative monitored wireless channel information.

10. The method of claim 8, wherein said alarm is generated when the change in the wireless channel information exceeds a variable threshold.

11. The method of claim 10, wherein a value of the threshold is set based on (1) a maximum value generated by applying the generalized likelihood ratio test to a sequence of channel estimate values generated during an initial training period of said transmitter and (2) an acceptable false alarm rate.

12. A method of authenticating a transmitting device in a communication system using at least one multi-mode reconfigurable antenna, comprising the steps of:
    collecting wireless channel information for different antenna modes of said at least one reconfigurable antenna for a legitimate transmitter;
    combining the collected wireless channel information for different modes of said at least one reconfigurable antenna into a characteristic transmission fingerprint;
    forming a detection threshold based on the characteristic transmission fingerprint for the legitimate transmitter at the outset of a communication connection;
    comparing wireless channel information from a later transmission with said fingerprint based on a test metric to determine if the wireless channel information from the later transmission corresponds to said fingerprint within a designated threshold; and
    identifying the transmitter of said later transmission as an intruder if said wireless channel transmission does not correspond to said fingerprint within said designated threshold,
    wherein respective antennas in said communication system cycle through said modes during the transmission of a data packet including training symbols, a payload, and a pad between the payload and training symbols during which a channel estimation is performed for the respective modes.

13. The method of claim 12, wherein the pad has a duration long enough to permit said respective antennas to switch modes.

14. The method of claim 12, wherein the test metric comprises an angle between the fingerprint of a later transmission and said fingerprint.

15. The method of claim 14, wherein an acceptable angle range between the later transmission and the fingerprint is determined based on an acceptable false alarm rate.

16. The method of claim 12, wherein the computed test metrics are gathered to form a distribution function on the test metric to determine the designated threshold for the given false alarm rate.

17. The method of claim 12, wherein the different modes of said at least one reconfigurable antenna are at least partially decorrelated.

18. The method of claim 12, wherein the designated threshold is adaptive.

19. The method of claim 12, further comprising the step of detecting intrusion into a wireless transmission between a transmitter and a receiver of the communication system.

20. The method of claim 19, wherein the wireless channel information for different modes is collected at a physical layer of the transmitter and the intrusion detecting step comprises:
    monitoring the wireless channel information using a generalized likelihood ratio test; and
    generating an alarm when an abrupt change in the wireless channel information is detected, said abrupt change being representative of an intrusion.

21. The method of claim 20, wherein the wireless channel information is provided for multiple decorrelated modes of the reconfigurable antenna and said alarm is generated when a cumulative abrupt change over multiple modes is observed in the cumulative monitored wireless channel information.

22. The method of claim 20, wherein said alarm is generated when the change in the wireless channel information exceeds a variable threshold.

23. The method of claim 22, wherein a value of the threshold is set based on (1) a maximum value generated by applying the generalized likelihood ratio test to a sequence of channel estimate values generated during an initial training period of said transmitter and (2) an acceptable false alarm rate.

* * * * *